US012650314B2

(12) United States Patent (10) Patent No.: US 12,650,314 B2
Xiao et al. (45) Date of Patent: Jun. 9, 2026

(54) GLOBAL MAP BASED DEEP REINFORCEMENT LEARNING FOR PARKING

(71) Applicant: Valeo Schalter und Sensoren GmbH, Bietigheim-Bissingen (DE)

(72) Inventors: Xinhua Xiao, Bietigheim-Bissingen (DE); He Huang, Bietigheim-Bissingen (DE); Thomas Heitzmann, Bietigheim-Bissingen (DE)

(73) Assignee: Valeo Schalter Und Sensoren GmbH, Bietigheim-Bissingen (DE)

( * ) Notice: Subject to any disclaimer, the term of this patent is extended or adjusted under 35 U.S.C. 154(b) by 105 days.

(21) Appl. No.: 18/405,104

(22) Filed: Jan. 5, 2024

(65) Prior Publication Data

US 2025/0224246 A1 Jul. 10, 2025

(51) Int. Cl.
*G01C 21/36* (2006.01)
*B60W 30/06* (2006.01)
(Continued)

(52) U.S. Cl.
CPC ......... *G01C 21/3685* (2013.01); *B60W 30/06* (2013.01); *B60W 50/14* (2013.01);
(Continued)

(58) Field of Classification Search
CPC ... G01C 21/3685; B60W 30/06; B60W 50/14; B60W 2050/146; B60W 2420/403; B60W 2556/40; B60W 2556/45; G08G 1/143
See application file for complete search history.

(56) References Cited

U.S. PATENT DOCUMENTS 9,796,381 B2 * 10/2017 Jung ..................... B60W 30/06
10,683,005 B2 * 6/2020 Bonander ........... G05D 1/0033
(Continued)

FOREIGN PATENT DOCUMENTS

CN 115546303 A * 12/2022 ........... G06V 20/586
EP 3444637 A1 * 2/2019 .......... B60W 60/015
(Continued)

OTHER PUBLICATIONS

G. Chen et al., "Robot Navigation with Map-Based Deep Reinforcement Learning," 2020 IEEE International Conference on Networking, Sensing and Control (ICNSC), Nanjing, China, Feb. 2020, 6 pages.
(Continued)

*Primary Examiner* — Babar Sarwar
(74) *Attorney, Agent, or Firm* — Valeo Schalter Und Sensoren GmbH

(57) ABSTRACT

A method for calculating an optimum route for a first vehicle to travel from a current location to a selected parking space includes receiving map data of a parking zone, the map data including local map data and global map data of the parking zone, sensor data, parking space data indicating availability of parking spaces within the parking zone, and vehicle dynamics and location data, selecting, as the selected parking space, at least one available parking space based on the parking space data, determining a plurality of target positions between the current location and the selected parking space, calculating, in response to the selecting of the selected parking space and based on the plurality of target positions, the optimum route, including calculating trajectories of the first vehicle along an entire route between the current location and the selected parking space, and controlling the first vehicle to travel from the current location to the selected parking space.

19 Claims, 13 Drawing Sheets

(51) Int. Cl.
   *B60W 50/14* (2020.01)
   *G08G 1/14* (2006.01)
(52) U.S. Cl.
   CPC ....... *G08G 1/143* (2013.01); *B60W 2050/146*
      (2013.01); *B60W 2420/403* (2013.01); *B60W*
      *2556/40* (2020.02); *B60W 2556/45* (2020.02)

(56)                     References Cited

U.S. PATENT DOCUMENTS

| | | | | |
|---|---|---|---|---|
| 10,789,845 B2 * | 9/2020 | Suzuki | ................. | B60W 30/06 |
| 10,832,574 B1 * | 11/2020 | Agarwal | ............... | G08G 1/144 |
| 11,493,359 B2 * | 11/2022 | Maeda | ............... | G01C 21/3691 |
| 12,315,372 B2 * | 5/2025 | Honda | ................ | B60W 60/001 |
| 2014/0122190 A1 * | 5/2014 | Wolfson | ................. | G08G 1/141 |
| | | | | 705/13 |
| 2016/0125736 A1 * | 5/2016 | Shaik | ....................... | G08G 1/14 |
| | | | | 701/410 |
| 2016/0303969 A1 * | 10/2016 | Akula | .................. | A61B 5/6893 |
| 2020/0079360 A1 * | 3/2020 | Tsujino | ................. | B60W 50/14 |
| 2020/0086851 A1 * | 3/2020 | Krekel | ....................... | B62D 1/00 |
| 2020/0086852 A1 * | 3/2020 | Krekel | ................. | B60W 50/14 |
| 2020/0284588 A1 * | 9/2020 | Sundar | ................. | G06V 20/586 |
| 2020/0307559 A1 * | 10/2020 | Göricke | ................. | G08G 1/168 |
| 2020/0348147 A1 * | 11/2020 | Maeda | ............... | G01C 21/3691 |
| 2021/0101586 A1 * | 4/2021 | Woo | ................... | B62D 15/0285 |
| 2021/0213939 A1 * | 7/2021 | Woo | ..................... | G05D 1/0016 |
| 2021/0316718 A1 * | 10/2021 | Sugano | .................. | G06Q 10/20 |
| 2022/0350994 A1 * | 11/2022 | Yang | .................... | B60W 30/06 |
| 2022/0366369 A1 * | 11/2022 | Nice | .................... | G01C 21/343 |
| 2023/0141416 A1 * | 5/2023 | Kulkarni | ................ | H04W 4/44 |
| | | | | 701/423 |
| 2023/0206763 A1 * | 6/2023 | Beaurepaire | ......... | G08G 1/0145 |
| | | | | 340/932.2 |
| 2023/0228591 A1 * | 7/2023 | Sundar | ............... | G01C 21/3885 |
| | | | | 701/400 |
| 2023/0230135 A1 * | 7/2023 | Yamaura | .................. | G08G 1/14 |
| | | | | 701/24 |
| 2023/0278593 A1 * | 9/2023 | Wang | .............. | B60W 60/00276 |
| | | | | 701/26 |
| 2023/0306846 A1 * | 9/2023 | Sasatani | ................. | G08G 1/141 |
| 2024/0068825 A1 * | 2/2024 | Szubbocsev | ..... | G08G 1/096827 |
| 2024/0416954 A1 * | 12/2024 | Ogawa | ................... | G08G 1/143 |

FOREIGN PATENT DOCUMENTS

| | | | | | |
|---|---|---|---|---|---|
| WO | WO-2021263248 A1 | * | 12/2021 | .............. | H04W 4/33 |
| WO | WO-2023140041 A1 | * | 7/2023 | ........ | B60W 60/0011 |

OTHER PUBLICATIONS

Junzuo, Li, and Long Qiang. "An Automatic Parking Model Based on Deep Reinforcement Learning." Journal of Physics: Conference Series. vol. 1883. No. 1. IOP Publishing, 2021, 9 pages.

M. Theile, H. Bayerlein, R. Nai, D. Gesbert and M. Caccamo, "UAV Path Planning using Global and Local Map Information with Deep Reinforcement Learning," 2021 20th International Conference on Advanced Robotics (ICAR), Ljubljana, Slovenia, Oct. 2021, 8 pages.

Yuan, Zheng, et al. "Hierarchical Trajectory Planning for Narrow-Space Automated Parking with Deep Reinforcement Learning: A Federated Learning Scheme." Sensors 23.8 (2023): 4087, 19 pages.

* cited by examiner

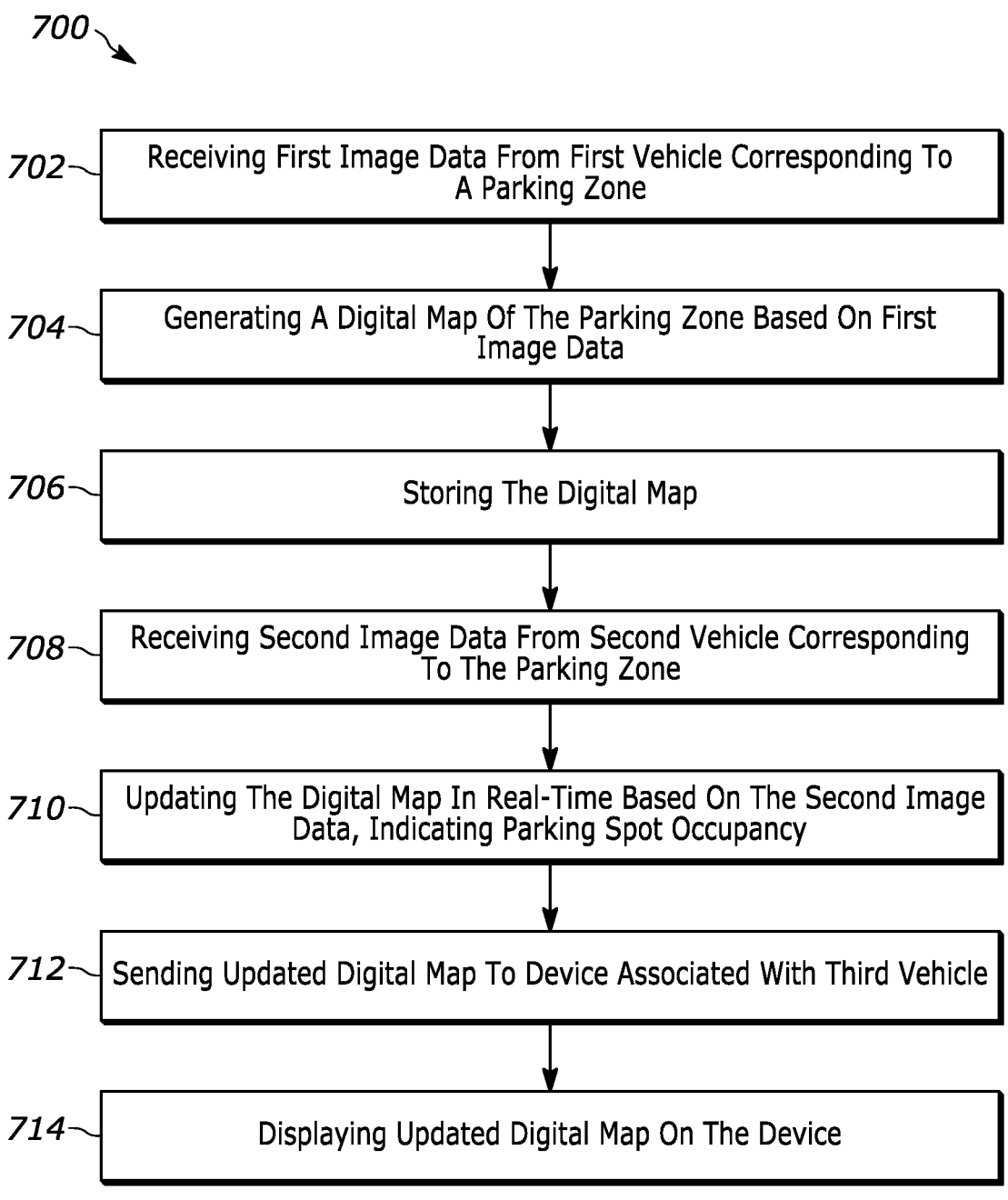

700

702 — Receiving First Image Data From First Vehicle Corresponding To A Parking Zone 704 — Generating A Digital Map Of The Parking Zone Based On First Image Data 706 — Storing The Digital Map 708 — Receiving Second Image Data From Second Vehicle Corresponding To The Parking Zone 710 — Updating The Digital Map In Real-Time Based On The Second Image Data, Indicating Parking Spot Occupancy 712 — Sending Updated Digital Map To Device Associated With Third Vehicle 714 — Displaying Updated Digital Map On The Device

FIG. 7A

GLOBAL MAP BASED DEEP REINFORCEMENT LEARNING FOR PARKING

TECHNICAL FIELD

The present disclosure relates to methods and systems for assisting a vehicle to park based on real-time parking spot availability data.

BACKGROUND

Modern automotive vehicles are typically equipped with a variety of sensors. Whether internal or external to the passenger cabin of the vehicle, these sensors provide the foundation for driving automation and vehicle autonomy. Vehicles with autonomous or semi-autonomous driving or driver-assistant features use these sensors and associated computer vision technology to provide parking assistance. Parking assist systems can help drivers park their vehicles in parking spaces, either automatically or guiding the driver to do so.

SUMMARY

A method for calculating an optimum route for a first vehicle to travel from a current location to a selected parking space includes receiving map data of a parking zone, the map data including local map data and global map data of the parking zone, sensor data, parking space data indicating availability of parking spaces within the parking zone, and vehicle dynamics and location data, selecting, as the selected parking space, at least one available parking space based on the parking space data, determining a plurality of target positions between the current location and the selected parking space, calculating, in response to the selecting of the selected parking space and based on the plurality of target positions, the optimum route, including calculating trajectories of the first vehicle along an entire route between the current location and the selected parking space, and controlling the first vehicle to travel from the current location to the selected parking space.

Other aspects of the disclosed embodiments include systems configured to perform steps and functions of the described methods, and a non-transitory computer-readable storage medium storing one or more programs, the one or more programs comprising instructions which, when executed by one or more processors of an electronic device, cause the electronic device to perform steps and functions of the described methods.

These and other aspects of the present disclosure are disclosed in the following detailed description of the embodiments, the appended claims, and the accompanying figures.

BRIEF DESCRIPTION OF THE DRAWINGS

FIG. 7A illustrates a flow diagram of an example method for assisting a vehicle to park based on real-time parking spot availability data, according to an embodiment.

DETAILED DESCRIPTION

Figure 1:
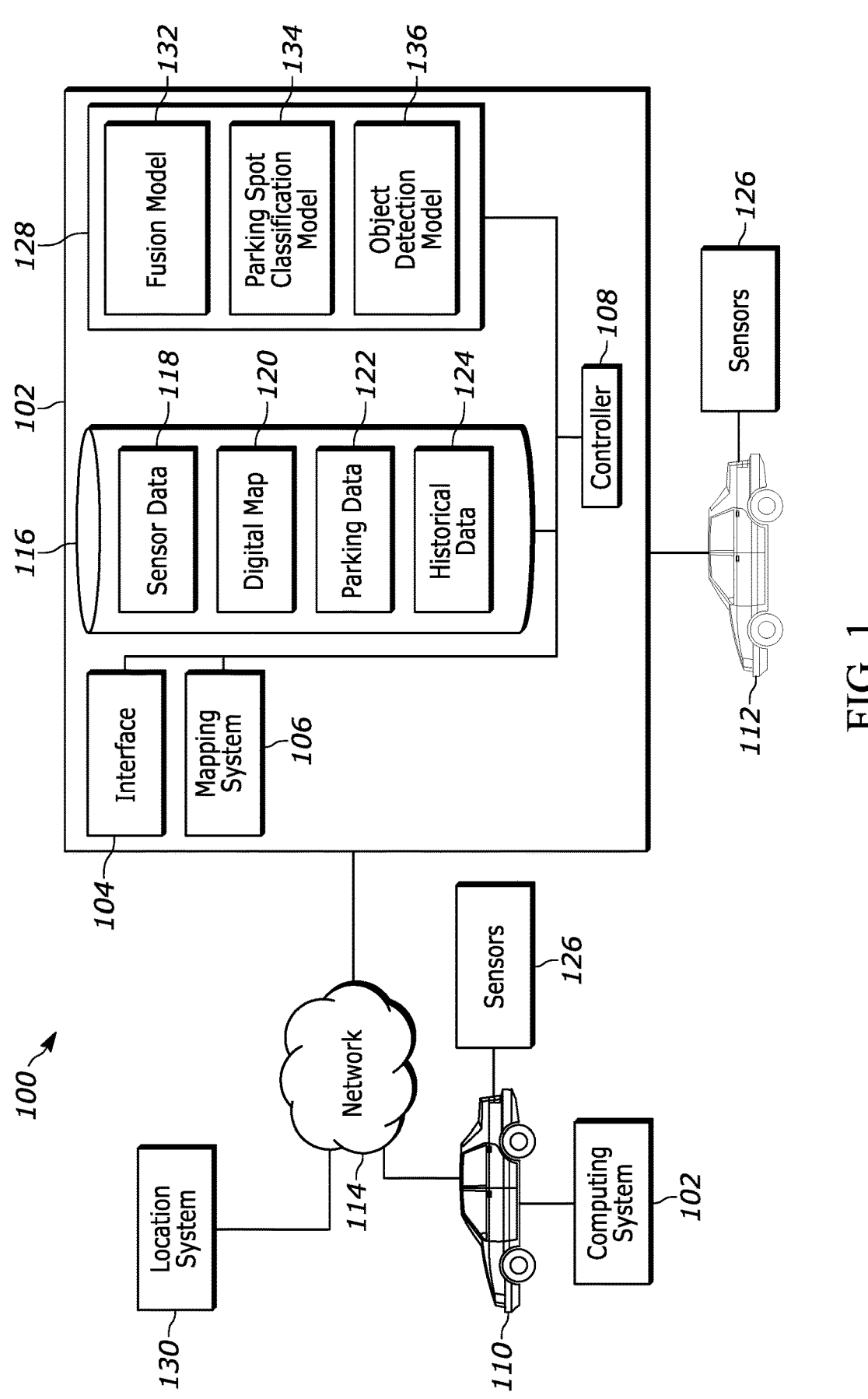
FIG. 1 illustrates a block diagram depicting an example system of assisting a vehicle to park based on real-time parking spot availability data, according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

Some portions of this description describe the embodiments of the disclosure in terms of algorithms and operations. These operations are understood to be implemented by computer programs or equivalent electrical circuits, machine code, or the like, examples of which are disclosed herein. Furthermore, these arrangements of operations may be referred to as modules or units, without loss of generality.

The described operations and their associated modules or units may be embodied in software, firmware, and/or hardware.

Steps, operations, or processes described may be performed or implemented with one or more hardware or software modules, alone or in combination with other devices. Although the steps, operations, or processes are described in sequence, it will be understood that in some embodiments the sequence order may differ from that which has been described, for example with certain steps, operations, or processes being omitted or performed in parallel or concurrently.

References herein to a "parking zone" should be construed to include parking lots, parking garages, streets with parking spots (e.g., parallel or angled parking spots next to a drive lane on a road), and other similar spaces where several parking spots are concentrated or grouped together. A parking zone can include a physical area that is established for parking, storing, or keeping a vehicle for a period of time. The parking zone can include one or more markers, lines, signs, or other indications to facilitate parking or define aspects of the parking zone. For example, the parking zone may or may not include parking lines that define or allocate a physical area or space in which a vehicle is to park. The parking lot can include signs that provide parking restrictions, such as types of vehicles that can park in a parking space or spot (e.g., small vehicle, mid-size vehicle, full size vehicle, sports utility vehicle, truck, hybrid, electric vehicle), requirements (e.g., handicap sticker), or time constraints (e.g., 1 hour parking, 2 hour parking).

It is nearly ubiquitous for modern vehicles to be equipped with a variety of sensors. Whether internal or external to the passenger cabin of the vehicle, these sensors provide the foundation for driving automation and vehicle autonomy. Vehicles with autonomous or semi-autonomous driving or driver-assistant features can use these sensors and associated computer vision technology to provide parking assistance. Parking assist systems can help drivers park their vehicles in parking spaces, either automatically or guiding the driver to do so. However, in order to find an available parking space in a parking zone, a vehicle typically must enter the parking zone whereupon the vehicle's sensors or the driver drives back and forth within the parking zone while visually scanning for unoccupied parking spots. This can be tedious and time-consuming, leading to frustration and unwanted fuel consumption. Further, only motion planning and local environment data may be used for parking map options to determine parking availability.

Parking systems and methods according to the principles of the present disclosure are configured to assist a vehicle to park based on real-time parking spot availability data and global map data. For example, a live or real-time digital map of the parking zone can be provided to the vehicle and/or driver. The digital map can indicate which parking spots are unoccupied. Such a digital map is generated utilizing the sensor data of vehicles that are currently parked in the parking zone, or have just recently traveled through the parking zone and have scanned the parking zone.

The parking systems and methods are further configured to implement global parking planning for parking map options. For example, global map data may be used for selecting and navigating to parking spots. As used herein, global map data includes sensor and/or other data indicative of features (parking space availability/occupancy, fixed or moving obstacles, such as walls, barriers, signs, and so on, types of parking spaces, etc.) of the entire parking zone obtained, directly or indirectly (e.g., via a remote server, cloud computing system, etc.), from multiple sources, such as a plurality of vehicles, cameras/sensors arranged within and/or in the vicinity of the parking zone, etc.

In an example, the global map data is used for deep reinforcement learning of the parking zone. In this manner, global parking planning and motion planning are integrated into a single search for resolving both parking spot selection and navigation through the parking zone to selected parking spots. Global parking planning allows for determination of both open parking spots and parking spot accessibility (e.g., options for handicap parking, electric vehicle (EV) parking, regular parking, etc.). Accordingly, potential parking spots and optimum route (including corresponding vehicle trajectories/motion planning) are determined prior to driving to the parking spots. As used herein, the term "trajectory" refers to, in part, a linear curvature of a path or route traveled by a vehicle.

The disclosed solutions have a technical advantage relative to other parking assistance systems due to the digital map provided to the driver and/or vehicle. First, an overall global map of the parking zone can be created and stored in a remote server. Then, as another vehicle approaches the parking zone, the vehicle can access the stored global map of the parking zone, and data relating to the availability of parking spaces in that parking zone as determined from the sensors currently (or recently) in the parking zone. Those sensors can be on vehicles that are traveling (or have traveled) through the parking zone, or are currently parked in the parking zone. Thus, instead of having to drive around the parking zone looking for an available parking spot, the vehicle (or its driver) is provided with a real-time, updated (based on global map data) digital map of the parking zone with indications as to which parking spots are currently available. Further, the optimum route for driving to the parking spots is determined based on the global map data. If the vehicle is an autonomous vehicle, the vehicle can then be commanded to drive to one of the available parking spots/spaces using the determined optimum route.

FIG. 1 illustrates a block diagram depicting an example system 100 for assisting a vehicle to park based on real-time parking spot availability data (including global map data). The system 100 can include at least one computing system 102 for use in map generation and updating based on sensor data, stored data, and utilizing one or more machine-learning models. The computing system can include at least one interface 104, and at least one mapping system 106 for generating and updating a digital map of a parking zone, and at least one controller 108. The mapping system 106 according to the present disclosure implements both local map data (e.g., data obtained by a vehicle attempting to park, such as the first vehicle 110, using sensors to sense a local area around the vehicle) and global map data (e.g., data obtained by a plurality of vehicles, such as the first vehicle 110 and/or additional vehicles). The computing system 102 can include hardware or a combination of hardware and software, such as communications buses, circuitry, processors, communications interfaces, among others. The computing system 102 can reside on or within a corresponding vehicle (e.g., a host vehicle). For example, FIG. 1 shows a first vehicle 110 with a computing system 102 on-board, and a second vehicle 112 with another or similar computing system 102 on-board. Alternatively (or in addition), all or part of the computing system 102 can reside on a remote server (e.g., the cloud) which is communicatively coupled to the vehicles 110, 112 via a network 114. Each of the first vehicle 110 and the second vehicle 112 (or their corresponding computing system 102) can be communicatively connected to the network 114 to each other (e.g., via vehicle-to-vehicle (V2V) communication), to the cloud (e.g., via vehicle-to-cloud (V2C) communication), and/or to one or more other systems (e.g., a global positioning system (GPS), or to one or more communications devices).

For example, the vehicles may include one or more transceivers configured to establish a secure communication channel with another vehicle or the remote server wirelessly using one or more communication protocols, such as, for example, communication protocol based on vehicle-to-vehicle (V2V) communications, wireless local area network (WLAN) or wireless fidelity (WiFi, e.g., any variant of IEEE 802.11 including 802.11a/b/g/n), wireless personal area network (WPAN, e.g., Bluetooth, Zigbee), cellular (e.g., LTE, 3G/4G/5G, etc.), wireless metropolitan area network WIMAN (e.g., WiMax), and other wide area network, WAN technologies (e.g., iBurst, Flash-OFDM, EV-DO, HSPA, RTT, EDGE, GPRS), dedicated short range communications (DSRC), near field communication (NFC), and the like. This enables the exchange of information and data that is described herein.

The computing system 102 can also include at least one data repository or storage 116. The data repository 116 can include or store sensor data 118 (originating from the sensors described herein), a digital map or digital map data 120 (which may include global map data as described below in more detail), parking data 122, and historical data 124. The sensor data 118 can include information about available sensors, identifying information for the sensors, address information, internet protocol information, unique identifiers, data format, protocol used to communicate with the sensors, or a mapping of information type to sensor type or identifier. The sensor data 118 can further include or store information collected by vehicle sensors 126. The sensor data 118 can store sensor data using timestamps and date stamps. The sensor data 118 can store sensor data using location stamps. The sensor data 118 can categorize the sensor data based on a parking zone or characteristics of a parking zone.

Vehicle sensors 126 that generate the sensor data 118 can include one or more sensing elements or transducers that captures, acquires, records or converts information about its host vehicle or the host vehicle's environment into a form for processing. The sensors 126 can acquire or detect information about parking zones. The sensors 126 can detect a parking zone condition such as a road feature, boundary, intersection, lane, lane marker, or other condition. The sensors 126 can also detect a feature of a particular parking space, such as symbols that represent the parking space is for handicapped, emergency vehicles only, pregnant women (expectant mothers), and the like. The sensors 126 can, for example, acquire one or more images of the parking zone, which can be processed using image processing and object recognition to identify or detect features indicative of a parking zone, e.g., a parking sign, a stop sign, a handicap parking sign, or surface markings on a parking zone. As examples, the sensors 126 can be or include an image sensor such as a photographic sensor (e.g., camera), radar sensor, ultrasonic sensor, millimeter wave sensor, infra-red sensor, ultra-violet sensor, light detection sensor, lidar sensor, or the like. The sensors 126 can communicate sensed data, images or recording to the computing system 102 for processing, which can include filtering, noise reduction, image enhancement, etc., followed by object recognition, feature detection, segmentation processes, and the like. The raw data originating from the sensors 126 as well as the processed data by the computing system 102 can be referred to as sensor data 118 or image data that is sensed by an associated sensors 126.

The sensors 126 can also include a global positioning system (GPS) device that can determine a location of the host vehicle relative to an intersection, using map data with an indication of the parking zone. The GPS device can communicate with location system 130, described further below. The computing system 102 can use the GPS device and the map data to determine that the host vehicle (e.g., first vehicle 110) has reached the parking zone. The computing system 102 can use the GPS device and the map data to determine the boundaries of the parking zone. The sensors 126 can also detect (e.g., using motion sensing, imaging or any of the other sensing capabilities described herein) whether any other vehicle or object is present at or approaching the parking zone, and can track any such vehicle or object's position or movement over time for instance. The sensors 126 can also detect the relative position between another vehicle and a parking spot, e.g., whether or not a parking spot is occupied by a vehicle as indicated by at least a portion of the vehicle being between the boundaries of two adjacent parking spot lines.

Using any one or more of the aforementioned types of sensors 126, the vehicle (e.g., first vehicle 110) is able to virtually map the parking zone. For example, the sensors calculate relative distances between detected objects and the sensor itself, and the computing system 102 can utilize a visual simultaneous localization and mapping (SLAM) system. Visual SLAM is a position detecting scheme in which a process of generating a digital map of an environment (such as a parking zone) and a process of acquiring a location of the sensor or vehicle itself are complementarily performed. In other words, characteristics of the environment about the vehicle as well as the location of the vehicle itself are determined simultaneously.

The mapping system 106 can implement visual SLAM (or similar technologies) to generate a digital map of the parking zone. The mapping system 106 is designed, constructed or operational to generate digital map data based on the data sensed by the one or more sensors 126. The digital map data structure (or referred to as digital map 120) can generate the digital map from, with or using one or more machine learning models or neural networks established, maintained, tuned, or otherwise provided via one or more machine learning models 128. The machine learning models 128 can be configured, stored, or established on the computing system 102 of the first vehicle 110, or on a remote server. The mapping system 106 can detect, from a first neural network and based on the data sensed by the one or more sensors 126, objects located at the parking lot. The mapping system 106 can perform, using the first neural network and based on the data sensed by the one or more sensors 126, scene segmentation. The mapping system 106 can determine, using the first neural network and based on the data sensed by the one or more sensors 126, depth information for the parking zone. The mapping system 106 can identify, from the first neural network 114 and based on the data sensed by the one or more sensors 126, one or more parking lines or parking spots in the parking zone. The mapping system 106 can construct the digital map based on the detected objects located at the parking zone, the scene segmentation, the depth information for the parking zone, and the one or more parking lines at the parking zone.

The mapping system 106 can create the digital map 120 based on the sensor data 118. This digital map 120 can be created via implemented visual SLAM, as described above.

In one embodiment, the digital map 120 can include three dimensions on an x-y-z coordinate plate, and associated dimensions can include latitude, longitude, and range, for example. The digital map 120 can be updated periodically or reflect or indicate a motion, movement or change in one or more objects detected in the parking zone. For example, the digital map can include stationary objects associated with the scene, such as a curb, tree, lines, parking signs, or boundary of the parking zone, as well as non-stationary objects such as vehicles moving or a person moving (e.g., walking, biking, or running).

Various types of machine learning models 128 are disclosed herein. The machine learning model utilized by the mapping system 106 to generate the digital map 120 can include any type of neural network, including, for example, a convolution neural network, deep convolution network, a feed forward neural network, a deep feed forward neural network, a radial basis function neural network, a Kohonen self-organizing neural network, a recurrent neural network, a modular neural network, a long/short term memory neural network, or the like. Each machine learning model 128 can maintain, manage, store, update, tune, or configure one or more neural networks and can use different parameters, weights, training sets, or configurations for each of the neural networks to allow the neural networks to efficiently and accurately process a type of input and generate a type of output.

One or more of the disclosed machine learning models 128 disclosed herein can be configured as or include a convolution neural network. The convolution neural network (CNN) can include one or more convolution cells (or pooling layers) and kernels, that can each serve a different purpose. The convolution kernel can process input data, and the pooling layers can simplify the data, using, for example, non-linear functions such as a max, thereby reducing unnecessary features. The CNN can facilitate image recognition. For example, the sensed input data can be passed to convolution layers that form a funnel, compressing detected features. The first layer can detect first characteristics, the second layer can detect second characteristics, and so on.

The convolution neural network can be a type of deep, feed-forward artificial neural network configured to analyze visual imagery. The convolution neural network can include multilayer perceptrons designed to use minimal preprocessing. The convolution neural network can include or be referred to as shift invariant or space invariant artificial neural networks, based on their shared-weights architecture and translation invariance characteristics. Since convolution neural networks can use relatively less pre-processing compared to other image classification algorithms, the convolution neural network can automatically learn the filters that may be hand-engineered for other image classification algorithms, thereby improving the efficiency associated with configuring, establishing or setting up the neural network, thereby providing a technical advantage relative to other image classification techniques.

One or more of the disclosed machine learning models 128 disclosed herein can include a CNN having an input layer and an output layer, and one or more hidden layers that can include convolution layers, pooling layers, fully connected layers, or normalization layers. The one or more pooling layers can include local pooling layers or global pooling layers. The pooling layers can combine the outputs of neuron clusters at one layer into a single neuron in the next layer. For example, max pooling can use the maximum value from each of a cluster of neurons at the prior layer. Another example is average pooling, which can use the average value from each of a cluster of neurons at the prior layer. The fully connected layers can connect every neuron in one layer to every neuron in another layer.

To assist in generating the digital map 120, the computing system 102 can interface or communicate with a location system 130 via network 114. The location system 130 can determine and communicate the location of one or more of the vehicles 110, 112 during the performance of the SLAM or similar mapping techniques executed in generating the digital map 120. The location system 130 can include any device based on a positioning system such as Global Navigation Satellite System (GNSS), which can include GPS, GLONASS, Galileo, Beidou and/or other regional systems. The location system 130 can include one or more cellular towers to provide triangulation. The location system 130 can include wireless beacons, such as near field communication beacons, short-range wireless beacons (e.g., Bluetooth beacons), or Wi-Fi modules.

The computing system 102 can be configured to utilize interface 104 to receive and transmit information. The interface 104 can receive and transmit information using one or more protocols, such as a network protocol. The interface 104 can include a hardware interface, software interface, wired interface, or wireless interface. The interface 104 can facilitate translating or formatting data from one format to another format. For example, the interface 104 can include an application programming interface that includes definitions for communicating between various components, such as software components. The interface 104 can be designed, constructed or operational to communicate with one or more sensors 126 to collect or receive information, e.g., image data. The interface 104 can be designed, constructed or operational to communicate with the controller 108 to provide commands or instructions to control a vehicle, such as the first vehicle 110. The information collected from the one or more sensors can be stored as shown by sensor data 118.

The interface 104 can receive the image data sensed by the one or more sensors 126 regarding an environment or characteristics of a parking zone. The sensed data received from the sensors 126 can include data detected, obtained, sensed, collected, or otherwise identified by the sensors 126. As explained above, the sensors 126 can be one or more various types of sensors, and therefore the data received by the interface 104 for processing can be data from a camera, data from an infrared camera, lidar data, laser-based sensor data, radar data, transducer data, or ultrasonic sensor data. Because this data can, when processed, enable information about the parking zone to be visualized, this data can be referred to as image data.

The data sensed from the sensors 126 can be received by interface 104 and delivered to mapping system 106 for detecting various qualities or characteristics of a parking zone (e.g., parking lines, handicapped spaces, etc.) as explained above utilizing techniques such as segmentation, CNNs, or other machine learning models. For example, the mapping system 106 can rely on one or more neural networks or machine learning models 128 to detect objects, scene segmentation, roads, terrain, trees, curbs, obstacles, depth or range of the parking lot, parking line detection, parking marker detection, parking signs, or other objects at or associated with the parking zone. The computing system 102 can train the machine learning models 128 using historical data 124. This training can be performed remote from a computing system 102 installed on a vehicle 110, 112. In other words, the computing system 102 may be on a remote server for at least these purposes. Once trained, the models can be communicated to or loaded onto the vehicles 110, 112 via network 114 for execution.

Once generated, the digital map 120 can be stored in storage 116 and accessed by other vehicles. For example, the computing system 102 of a first vehicle 110 may be utilized to at least in part generate the digital map 120, whereupon that digital map 120 can be accessed by the computing system 102 of a second vehicle 112 that subsequently enters the parking zone. The computing system 102 of the second vehicle 112 (and other vehicles) can be utilized to update the digital map 120 in real-time based upon more reliable data captured form the second vehicle 112. In addition, the computing system 102 of both vehicles 110, 112 can be used to generate and continuously update parking data 122 in real-time. The parking data 122 represents data indicating characteristics of particular parking spots. For example, the parking data 122 can include a location of one or more parking spots, whether or not those parking spots are occupied or not occupied by a vehicle, and whether one or more of the parking spots are reserved for handicapped individuals, emergency vehicles only, vehicles carrying pregnant mothers, and the like, as described above. These qualities of the individual parking spots can be determined via the image data received from sensors 126 either when the digital map is generated, and/or when the digital map is updated by a second vehicle 112 or other vehicles. By updating the parking data 122 in real-time, a subsequent vehicle that enters the parking zone can be provided with live, accurate information about, for example, which parking spots are occupied or unoccupied.

As described above, one or more machine learning models 128 can be relied upon to perform the various functions described herein. These machine learning models 128 can include a fusion model 132, a parking spot classification model 134, an object detection model 136, and other models. The fusion model 132 with be described further with reference to FIG. 2; it is trained and configured to receive and fuse the image data 118, the digital map 120, and the parking data 122 and perform object detection and classification as described above, the results of which can be input into the parking spot classification model 134, for example.

The parking spot classification model 134 is trained and configured to, based on the above data, perform image classification (e.g., segmentation) to generate and update parking data relating to the parking spaces of the parking zone. For example, the parking spot classification model 134 can be a machine learning model that determines whether each parking spot is a normal parking spot, a handicapped parking spot, a charging station for an electric vehicle (and, for example, whether that charging station is for wireless charging or charging by cable), and/or whether each parking spot has an allowed duration of parking (e.g., 1 hour, 2 hours, etc.). The output of this parking spot classification model 134 can be used to update the digital map 120 and parking data 122 if necessary.

The objection detection model 136 is trained and configured to, based on the above data, detect objects or obstacles in the parking zone. This can include parking lines used to determine whether a parking spot is present. The objection detection model 136 can, for example, determine the presence of a vehicle in a parking spot, thus enabling a determination that a parking spot is occupied. The objection detection model 136 can also determine the presence of a pothole, cone, debris, or other object in the parking zone, which can be stored in storage 116 and communicated to other vehicles (e.g., vehicle 112) that subsequently enter the parking zone.

Figure 2A:
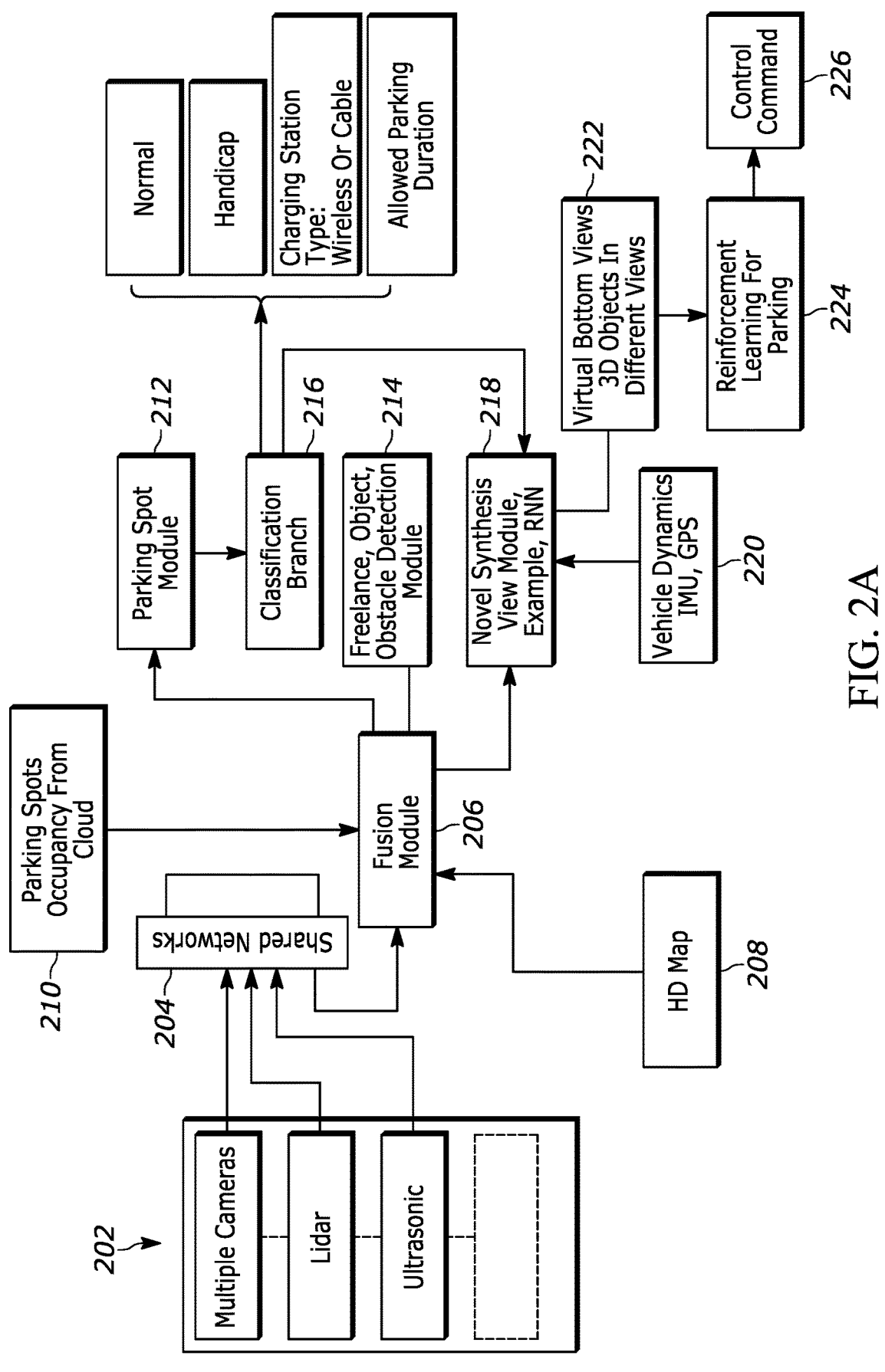
FIG. 2A illustrates an example operational diagram for implementing the system of FIG. 1, according to an embodiment.

FIG. 2A illustrates an example operational diagram for implementing the system 100 of FIG. 1. The various operations illustrated here can be performed by one or more system, component, or function depicted in FIG. 1. For example, the operations can be performed by computing system 102, mapping system 106, controller 108, and the various machine learning models 128 disclosed above. At 202, the computing system can receive, identify or collect data sensed by one or more sensors, such as those described above (e.g., camera, lidar, ultrasonic, one or more other types of sensors (shown in dashed lines), etc.). The computing system can collect the data in a raw format or preprocessed format. In some cases, the computing system can collect the data responsive to a request to collect data. For example, the computing system can collect the data in response to a location of the vehicle entering or becoming closer a particular parking zone, an input from the driver indicating a desire to learn about the parking zone, or the like.

At 204, the computing system can pass the data collected from 202 to shared networks (e.g., shared convolution layers of a neural network). The shared networks can include one or more of the machine learning models 128 described above, and/or can include multiple sub-neural networks of a particular model. The data collected from 202 can, for example, be fed into shared networks that include an input layer, one or more hidden layers (e.g., convolution layers, pooling layers, weighted layers), and one or more output layers. The final output of one or more of the shared networks can be, for example, object detection information, depth information, parking line detection information, or other information such as those disclosed above regarding the environment sensed by the sensors about the parking zone.

At 206, a fusion module (e.g., the fusion model 132) is executed which fuses one or more of the outputs of the shared networks 204 to allow subsequent machine learning models to output accurate results. The computing system can generate or update the digital map based on the fusion of depth, object/obstacle detection, road information and location information described above. The computing system can generate the digital map using the object detection information, scene segmentation information, depth information, parking line detection, and the like generated from the one or more machine learning models 128, 204. In an embodiment, a pre-generated high definition map (HD map) 208 is provided to the fusion module at 206. The pre-generated high definition map can be a digital map such as digital map 120 that was already generated from data received from one or more vehicles that have already traversed the parking zone. In an embodiment, parking spot occupancy information 210 (e.g., parking data 122) is transferred from a remote server to the fusion model.

The fusion of data at 206 enables the computing system to execute several of the machine learning models described above, such as the parking spot classification model 134 at 212, the object detection model 136 at 214, etc. The parking spot classification model at 212 can rely or execute classification tasks at 216, which include classifying the detected parking spots into one or more categories, such as normal, handicapped, a metered parking space (e.g., with a maximum duration) or a parking space equipped with a charging station.

A synthesis view module 218 receives several data such as the output of the fusion module 206 (including the digital map 120) and the output of the classification tasks 216. The synthesis view module 218 also receives various vehicle dynamics data 220 as determined from one or more vehicle sensors (e.g., sensors 126), such as, for example, an inertial measurement or motion unit (IMU) or a GPS device. The vehicle dynamics can include locational information and positional information of the vehicle. For example, the vehicle dynamics data 220 can indicate the vehicle is located within a particular parking zone, at a particular location in the parking zone, and facing a particular direction within the parking zone. The synthesis view module 218 then outputs for display a map or view of at least a portion of the parking zone that can indicate several of the information described herein. For example, the synthesis view module 218 can cause a map of the parking zone with real-time information regarding the availability of parking spots in the parking zone, a labeling of one or more of the parking spots as being in a particular classification (e.g., normal, handicap, etc.), and other information. Various embodiments of the synthesis view module 218 are described below with reference to FIGS. 4-6.

The synthesis view module 218 can cause the digital map and associated parking zone information to be displayed on different types of display devices. For example, the display device may be a liquid crystal display (LCD), or active matrix display, for displaying information to a user such as a driver of the vehicle. The display can be part of a vehicle dashboard, and can be part of the computing system 102. In another embodiment, the display device is a screen of a mobile device such as a smart phone, wearable device (e.g., smart watch), or the like. The display device may be associated with a particular vehicle in that the display device is mounted to that vehicle, or a driver or occupant within the vehicle is operating the display device. The display device may be linked to the vehicle, such as via Phone as a Key (PAAK) technology.

Figure 6:
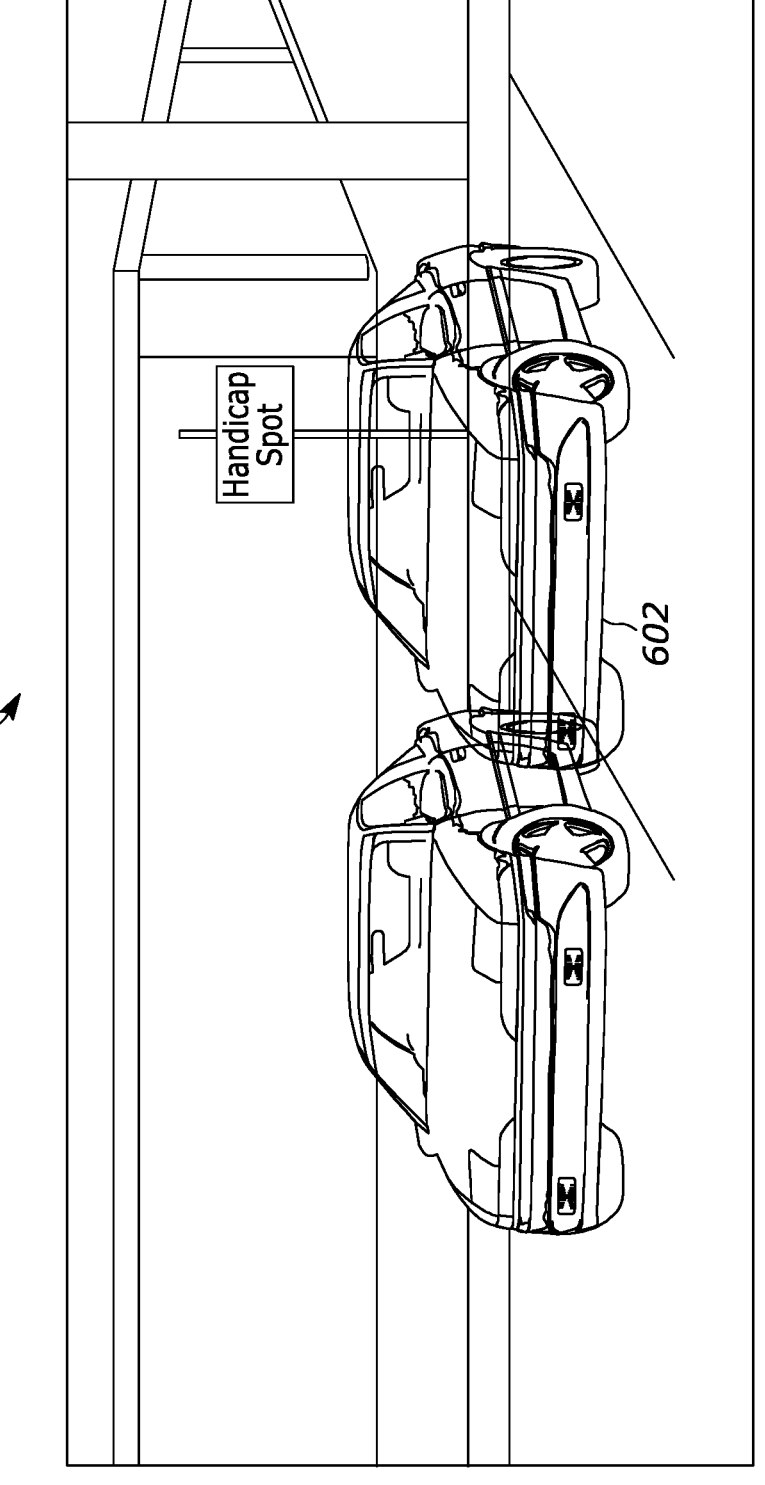
FIG. 6 illustrates an exemplary real-time virtual view of an area beneath a vehicle, according to an embodiment.

The synthesis view module 218 can also cause a virtual bottom view to be displayed on the display device at 222. The virtual bottom view is a virtual view of an area beneath the vehicle. An example of such a view is shown in FIG. 6. In one embodiment, the virtual bottom view shows an area surrounding the vehicle, as well as the area under the vehicle. The area surrounding the vehicle can be generated and viewed based on technology similar to bird's-eye-view (BEV) technology where camera images from various cameras about the vehicle are stitched together and modified to present a view that appears as if a single camera were placed vertically above the vehicle. But in a BEV, one cannot see the area beneath the vehicle. The synthesis module 218 is able to generate the virtual bottom view from image data deriving from sensors of other vehicles. For example, image data from a first vehicle that is parked or otherwise located in the parking zone may be communicated to a second vehicle that is about to perform a parking maneuver. The second vehicle can receive image data from the vehicle sensors on the second vehicle, as well as the image data received from the first vehicle. The images from the first vehicle can display an area of the ground beneath the second vehicle that may otherwise be hidden from the cameras on the second vehicle. This allows the second vehicle or its driver to view or detect obstacles or objects (e.g., potholes, debris, etc.) that might impair or hinder the parking maneuver. Additional detail of this concept is described with reference to FIG. 6 below.

Reinforcement learning 224 is also enabled by way of the generated virtual bottom view. For example, reinforcement learning can be utilized to understand characteristics of the parking spot, the detected objects beneath the vehicle, and the parking maneuver to learn what actions are considered to be acceptable during a parking maneuver. For example, if the virtual bottom view indicates the presence of a pothole beneath the vehicle attempting to park, then the driver or vehicle can be commanded at 226 to control the vehicle in a particular manner to avoid the pothole while still performing an adequate parking maneuver (e.g., the vehicle ending its parking action between both parking lines). Other semi-autonomous or fully-autonomous driving commands can be provided at 226 from controller 108 described above.

Figure 2B:
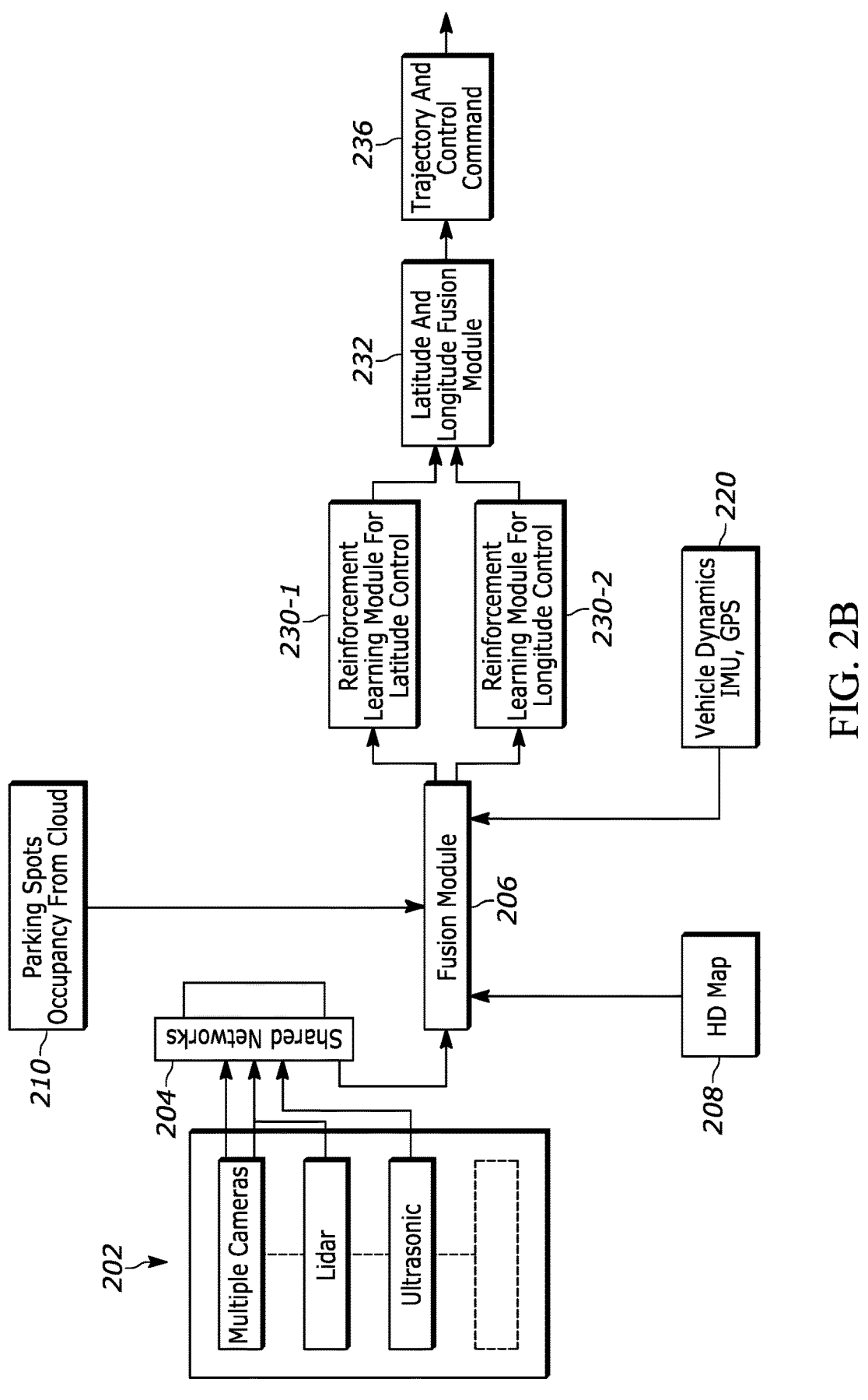
FIG. 2B illustrates another example operational diagram for implementing the system of FIG. 1, according to an embodiment.

FIG. 2B illustrates another example operational diagram for implementing the system 100 of FIG. 1. The system 100 may be configured to implement components or functions corresponding to FIG. 2B in addition to and/or instead of the components or functions of FIG. 2A. For example, a system implementing the components of FIG. 2B may be configured to further implement each of the components of FIG. 2A. However, some of the components of FIG. 2A are omitted from FIG. 2B for simplicity.

At 206, the fusion module (e.g., the fusion model 132) fuses the one or more of the outputs of the shared networks 204, the HD map 208, the parking spot occupancy information 210, and the vehicle dynamics data 220 (which includes locational information and IMU and wheel encoder data that indicates positional information of the vehicle, such as a pose of the vehicle). In this example, the HD map 208 includes global map data (e.g. obtained from a plurality of vehicles, sensors/cameras within the parking zone, a remote server or cloud computing system, etc.). The fusion of data at 206 enables the computing system to execute one or more of the machine learning models described above, such as the parking spot classification model 134 at 212, the object detection model 136 at 214, etc. Accordingly, outputs ("fused outputs") of the fusion module 206 indicate starting conditions of both the parking zone and the vehicle and may include, but are not limited to, a real-time or near real-time global map of the entire parking zone including all parking spaces, occupancy data for all parking spaces (i.e., an indicator of whether each parking space is occupied or available), category data for all parking spaces, and locational and positional information of the vehicle.

The fused outputs are provided to reinforcement learning modules 230-1 (reinforcement learning for latitude control) and 230-2 (reinforcement learning for longitude control), referred to collectively as reinforcement learning modules 230. The reinforcement learning modules 230 implement deep reinforcement learning to learn characteristics of the vehicle and the parking zone, an optimum route (and corresponding trajectories) for the vehicle to drive through the parking zone to a selected parking space, and a parking maneuver used to park in the parking space. In this manner, the reinforcement learning modules 230 learn which vehicle actions and behavior are considered to be acceptable during traversal of the parking zone and performance of the parking maneuver.

Outputs of the reinforcement learning modules 230 include a plurality of trajectory points along an optimum route from a current location of the vehicle to the selected parking space. For example, the reinforcement learning modules 230, individually or collectively, execute deep reinforcement learning planning (e.g., based on results of a path planner, costmap generator, etc., constraints for vehicle behavior and maneuverability, and so on) to calculate the optimum route and identify trajectory points along the optimum route. The trajectory points may correspond to latitude and longitude (e.g., x, y) coordinates within the parking zone. For example only, the reinforcement learning module 230-1 may output latitude coordinates while the reinforcement learning module 230-2 outputs longitude coordinates. A latitude and longitude fusion module 232 fuses the latitude and longitude coordinates into trajectory points including both latitude and longitude coordinates along a calculated optimum path from the current location of the vehicle to the selected parking space. While shown as separate components, in other examples the reinforcement learning modules 230 and the fusion module 232 may correspond to a single component.

A trajectory and control command module 236 receives an output of the fusion module 232. For example, the command module 236 receives trajectory points, including latitude and longitude coordinates, for an entire route (and corresponding trajectories) from the current location of the vehicle to the selected parking space. The output of the fusion module 232 may further include vehicle behavioral constraints such as velocity, acceleration, braking, gear changes, etc. The command module 232 generates commands, to the vehicle and/or driver, to control the vehicle in accordance with the trajectory points and vehicle behavioral constraints. In this manner, systems and methods of the present disclosure are configured to calculate, upon identification/selection of a target parking space, the optimum route and trajectories for an entire route from a current location of the vehicle to the parking space (i.e., rather than needing to continuously adjust the route, trajectories, vehicle behavior, etc. as local map data and features are identified).

Figure 2C:
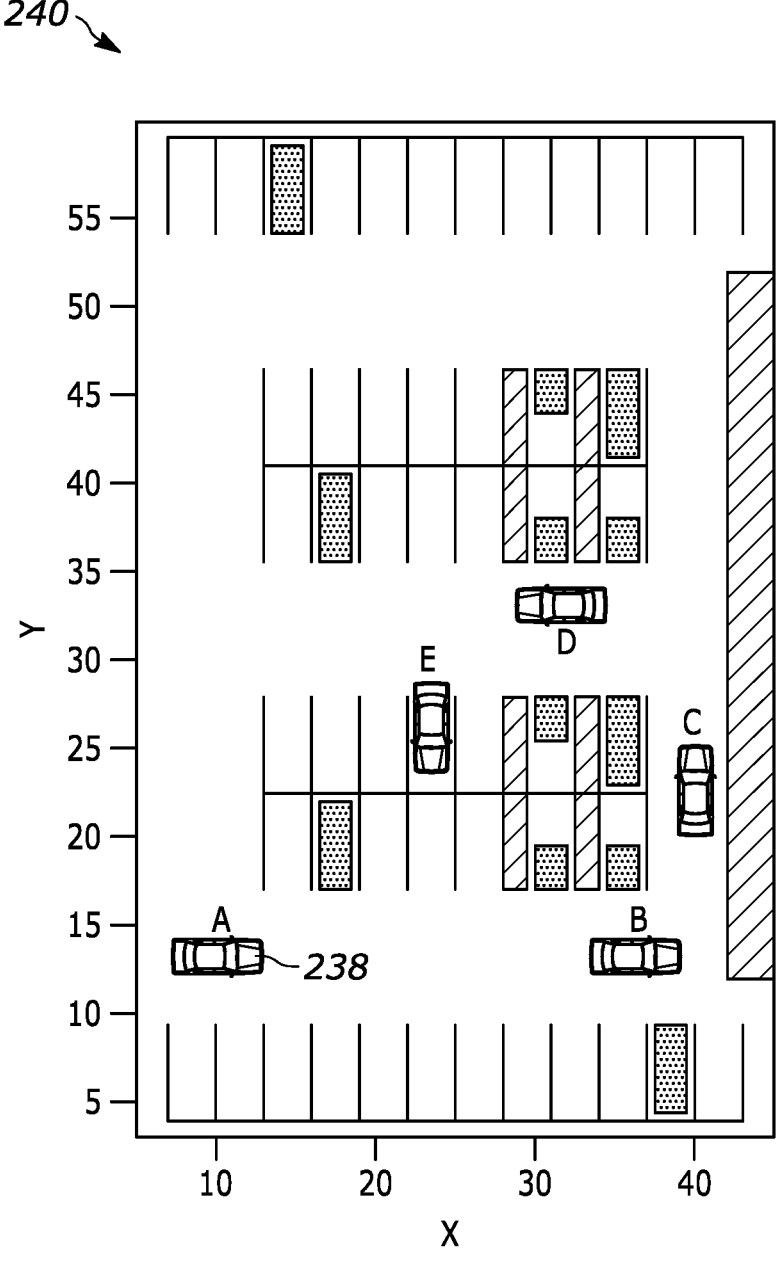
FIGS. 2C and 2D illustrate an example calculation of trajectory points and routes, according to an embodiment.
Figure 2D:
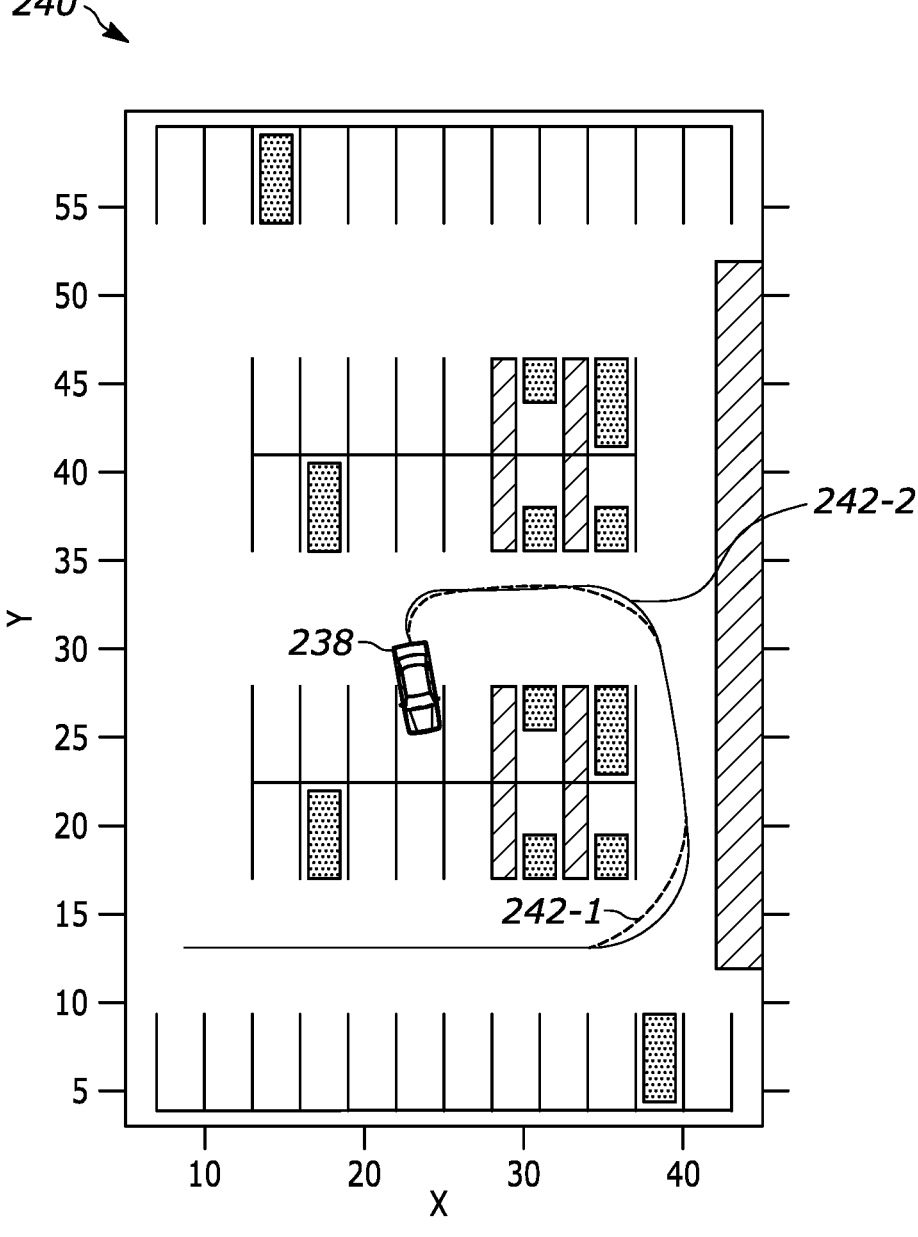

FIGS. 2C and 2D illustrate an example calculation of trajectory points and routes according to the present disclosure. For example, as shown in FIG. 2C, a vehicle 238 is shown at a current location A. As used herein, "current location" may refer to a current location of the vehicle 238 when a parking space is identified and/or selected. For example, one or more available parking spaces may be identified when the vehicle 238 enters a parking zone 240 in accordance with the systems and methods described herein, and one or more trajectory points and routes may be calculated for each of the available parking spaces, for a subset of the available parking spaces, only for an available parking space selected by the driver and/or the system 100, etc. In some examples, optimum routes may be calculated in accordance with the principles of the present disclosure for two or more of the available parking spaces and one of the parking spaces may be selected (and/or recommended to the driver) based on a comparison between the calculated optimum routes.

Upon identifying and/or selecting an available parking space for the vehicle 238, the system 100 as described above calculates a plurality of target positions/poses (B, C, D, E) for the vehicle 238 for a route between the current location A and a selected available parking space E. In some examples, the target positions correspond to the trajectory points calculated by the reinforcement learning modules 230. The target positions are calculated based on the inputs received and processed by the fusion module 206, reinforcement learning modules 230, and fusion module 232 as described with respect to FIG. 2B. For example, the target positions are calculated based on the current vehicle location/pose, the global map data, and the selected parking space. The target positions may include target pose (e.g., orientation, including roll, pitch, yaw, etc.) of the vehicle and other vehicle characteristics, such as speed/velocity, selected gear, etc. In other words, the target positions may not simply indicate location (e.g., x and y coordinates within the parking zone 240) but may also indicate target characteristics to be achieved at the respective locations. Accordingly, the optimum route and trajectories as calculated in accordance with the present disclosure may be based on various constraints for feel and driver comfort to minimize unnecessary acceleration, braking, gear changes, abrupt avoidance of obstacles, etc.

While four target positions are shown, fewer or more than four target positions may be calculated for a given route. In this example, the target positions may correspond to a target position (B) prior to a first turn, a target position (C) subsequent to the first turn/prior to a second turn, a target position (D) subsequent to the second turn/prior to turning into the selected parking space, and a target position (E) within the selected parking space.

Example routes 242-1 and 242-2 (referred to collectively as routes 242) for the vehicle 238 are shown in FIG. 2D. For example, the route 242-1 (e.g., the calculated optimum route) may correspond to an optimum route calculated using the target positions in accordance with the principles of the present disclosure while the route 242-2 may correspond to a route traveled without using the principles of the present disclosure (e.g., using conventional autonomous driving techniques, using only local data obtained by the vehicle 238 while navigating to the selected parking space, etc.). The calculated optimum route is calculated with the vehicle at position A for the entire route. Accordingly, the route 242-1, including target positions/poses, is calculated to minimize stops and starts, gear changes (e.g., changes between forward drive gears and/or changes between forward and reverse gears), distance traveled, etc. while still avoiding obstacles and collisions.

Figure 2E:
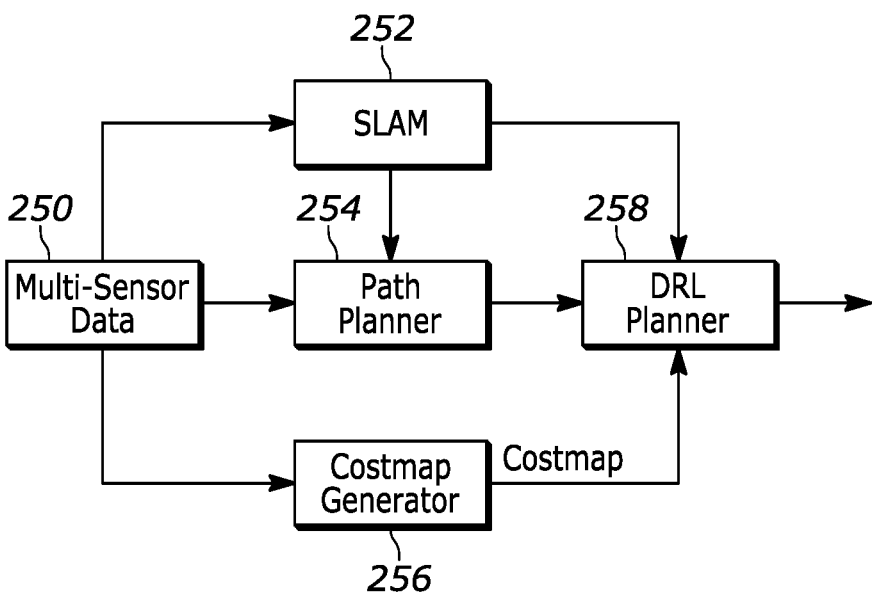
FIG. 2E shows an example implementation of deep reinforcement learning, according to an embodiment.

FIG. 2E shows an example implementation of deep reinforcement learning (DRL) executed by the system 100 (e.g., corresponding to functions performed by the fusion module 206, the reinforcement learning modules 230, the fusion module 232, etc.). Multi-sensor data 250 (e.g., as obtained at 202) is provided to a SLAM system 252, a path planner 254, a costmap generator 256, and a DRL planner 258. The SLAM system 252 generates a digital map of the parking zone as described above. The digital map according to the present disclosure includes and/or is generated at least in part using the global map data as defined herein. The digital map is provided to the path planner 254, the costmap generator 256, and the DRL planner 258. The SLAM system 252, the path planner 254, the costmap generator 256, and the DRL planner 258 may be implemented by a computing device or other circuitry of the system 100.

The path planner 254 calculates, for one or more available parking spaces, paths for the vehicle to navigate from the current location of the vehicle to the parking space. The path planner 254 calculates the paths based on the digital map, including the global map data, the sensor data, vehicle dynamics data, etc. The calculated paths include trajectories of the vehicle along the paths. The costmap generator 256 generates a costmap that represents a planning search space around the vehicle. The costmap contains information about the environment (e.g., the parking zone), such as obstacles or areas that the vehicle cannot traverse such as walls, objects to avoid, such as potholes or debris, etc. The information in the costmap may include values assigned to various locations within the environment to indicate likelihoods of collision with an object in those locations. The costmap is used by path planning algorithms, such as those executed by the DRL planner 258, to find collision-free paths for the vehicle to follow.

Accordingly, the DRL planner 258 according to the present disclosure is configured to learn an optimum route from the current location of the vehicle to a selected parking space using the digital map (and the included global map data), one or more paths and corresponding trajectories calculated by the path planner 254, and the costmap. For example, the DRL planner 258 interacts, through trial and error, with the environment as represented by the digital map to learn the optimum route.

Figure 2F:
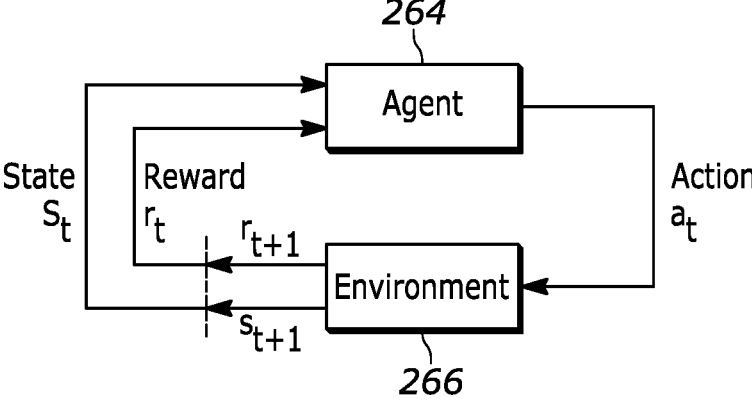
FIG. 2F shows an example process implemented by a deep reinforcement learning planner, according to an embodiment.

FIG. 2F shows an example process implemented by the DRL planner 258 to learn an optimum route according to the present disclosure. An agent 264 (e.g., as implemented by the system 100) interacts with a simulated environment 266 (e.g., a simulated environment corresponding to the digital map, global map data, etc.) and receives rewards or penalties based on results of the interaction. For example, the agent 264 receives a current state $s_t$ and reward $r_t$ from the environment 266 and outputs an action $a_t$ based on the current state and reward. The current state corresponds to, for example, a current location and pose of the vehicle, vehicle dynamics data, a state of the environment, etc. The action corresponds to one or more actions taken by the vehicle for a route, a segment of a route, etc. For example, the action may correspond to one or more actions taken for a segment of a route between the current location A and the position B, vehicle trajectories, acceleration, direction changes, gear changes, etc.

A next state $s_{t+1}$ and rewards $r_{t+1}$ are calculated based on the action and provided to the agent 264. In other words, an output of the environment 266 is adjusted based on the actions taken by the agent 264. In this manner, the agent 264 iteratively interacts with the environment 266 to maximize a total reward (e.g., a sum of rewards for respective actions) for a given route, segment of a route, etc. In one example, the DRL planner 258 calculates an optimum route by determining a route that achieves a maximum reward for traveling between a current location and the selected parking space. In some examples, the DRL planner 258 calculates an optimum first route segment between the current location A and the position B, an optimum second route segment between positions B and C, and so on.

Rewards assigned to a particular action or actions may include, but are not limited to, rewards to reduce a number of gear changes (or penalties for each gear change), rewards for shorter path lengths, rewards for maintaining greater distances from obstacles, rewards based on customer preferences, rewards for conserving fuel/energy, rewards for arriving closer to a corresponding destination, rewards for likelihood that the selected parking space will still be available upon arrival, etc.

Figure 3:
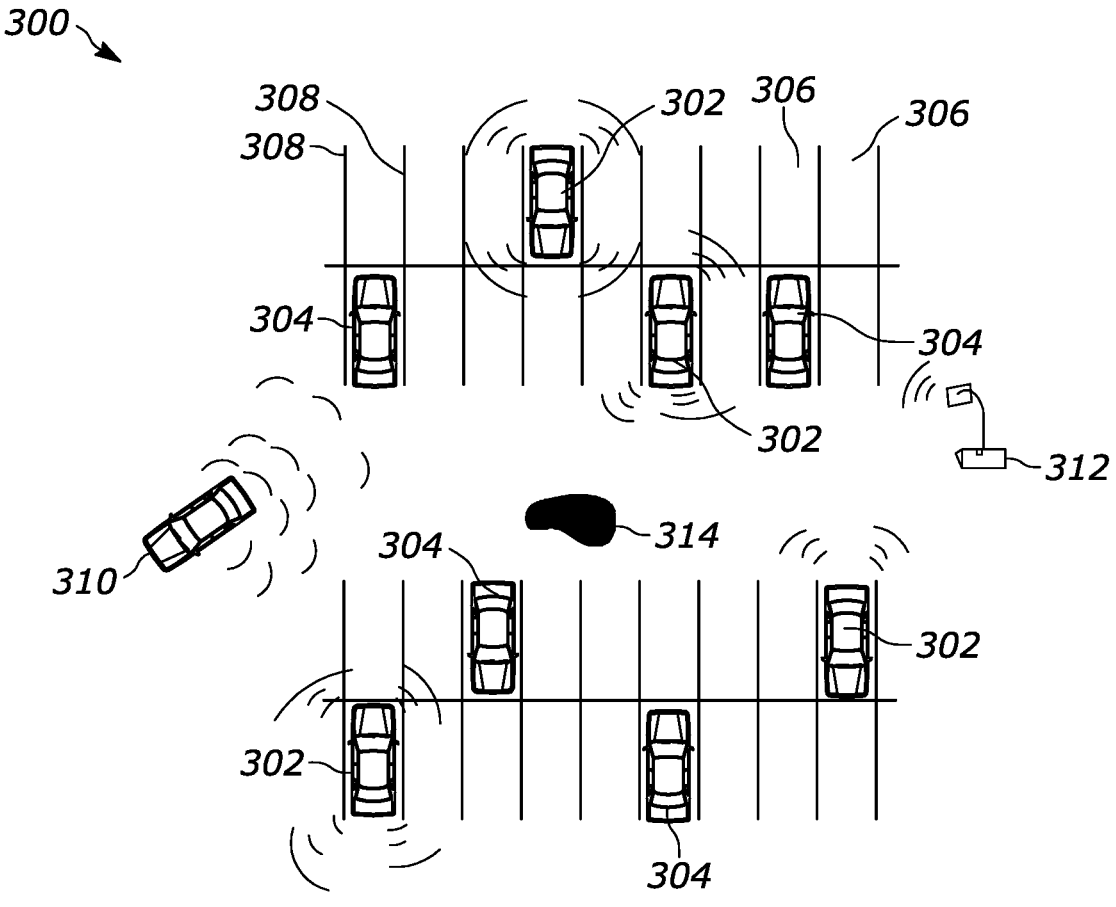
FIG. 3 illustrates an overhead schematic view of a parking zone and various vehicles equipped with sensors for generating image data used to create a digital map of the parking zone, according to an embodiment.

Example systems and methods for obtaining map data are generally described in FIGS. 3-7. FIG. 3 illustrates an overhead schematic view of a parking zone 300 and various vehicles 302 equipped with sensors for generating image data used to create a digital map of the parking zone, according to an embodiment. For example, the parking zone 300 may include a plurality of vehicles 302 with a computing system (e.g., computing system 102) described above, or at least some components of the described computing system. Each of the vehicles 302 is able to generate or update the digital map, perform parking spot classifications, and the other functions described above. The parking zone 300 may also include other vehicles 304 that do not have the capabilities of the computing systems 102 described herein. As shown, each of the illustrated vehicles 302, 304 are located within a respective parking spot 306 defined between a pair of parking lines 308, the presence of which can be determined via the machine learning explained above. As each vehicle 302 enters the parking zone 300 to park, the computing system of that vehicle 302 performs the mapping and updating processes described herein. For example, each vehicle can perform the visual SLAM processes, or update a previously-generated digital map 120 retrieved from storage upon entering the associated parking zone 300. The updating can include informing the remote server or other vehicle of one or more of the parking spots 306 being occupied or unoccupied by a vehicle, thereby causing the remote server to update the parking data. The vehicles 302 can update any of the data that forms the digital map and parking data described above so that a subsequent vehicle 310 that enters the parking zone 300 can download or retrieve the digital map 120 and parking data 122. This allows the computing system 102 of the vehicle 310 to determine which of the parking spots 306 in the parking zone 300 are available for parking (i.e., unoccupied), which of the parking spots 306 are labeled as handicapped, and so on. The vehicle 310 can then be commanded to drive to an appropriate spot that matches the desires of the vehicle or driver. For example, if the vehicle 310 and/or its driver determines that it is desirable to park in a parking spot equipped with a vehicle battery charger, the label associated with that particular parking spot is transferred from one or more of the other vehicles 302 and/or the remote server to the vehicle 310, whereupon the computing system 102 of that vehicle 310 can command (e.g., via controller 108) the vehicle 310 to drive to and park in the parking spot with the charger.

The parking zone 300 may also include one or more roadside units (RSUs) 312 or other fixed, stationary infrastructure device having wireless communication capabilities (e.g., DSRC, Wi-Fi, etc. as described above). The RSU 312 can have portions of a computing system 102 (e.g., sensors 126, transceiver, etc.) which allow the RSU 312 to detect the presence and location of vehicles in the parking zone 300. This enables either the RSU 312 or the computing system 102 of a remote server to perform updating of the digital map 120 to include real-time parking data, such as which parking spots are occupied or unoccupied. In short, the RSUs 312 can have one or more of the computing capabilities of the computing systems 102 described herein, wherein the RSU 312 provides a permanent structure giving capabilities for continuous real-time updating of the digital map and parking data.

One or more of the computing systems 102 equipped in the vehicles 302, 310 or RSU 312 can also determine the presence and location of an obstacle 314 in the parking zone. The obstacle 314 may be a pothole, animal, debris, patch of ice, or other object that would be beneficial for the driver or vehicle 310 to know of. This may alter the decision of the vehicle or its driver to park in a particular parking spot. For example, if a large object 314 is detected to be present in front of a parking spot, the computing system 102 of the vehicle 310 or the driver may decide not to park in that particular parking spot.

In short, and summarizing the capabilities of the systems described above, the systems described herein allow a vehicle 310 to enter a parking zone 300 and obtain valuable information about the parking zone 300 as detected and transmitted by other vehicles 302 and/or RSUs 312. The valuable information may include an updated digital map, associated parking data, and the like which allow the vehicle 310 to understand which parking spots are available for parking. The image data captured by the computing systems 102 of the vehicles 302 and/or RSUs 312 also enable the virtual bottom view of the vehicle 310 to be constructed as the vehicle 310 is parking in a particular parking spot.

Figure 4:
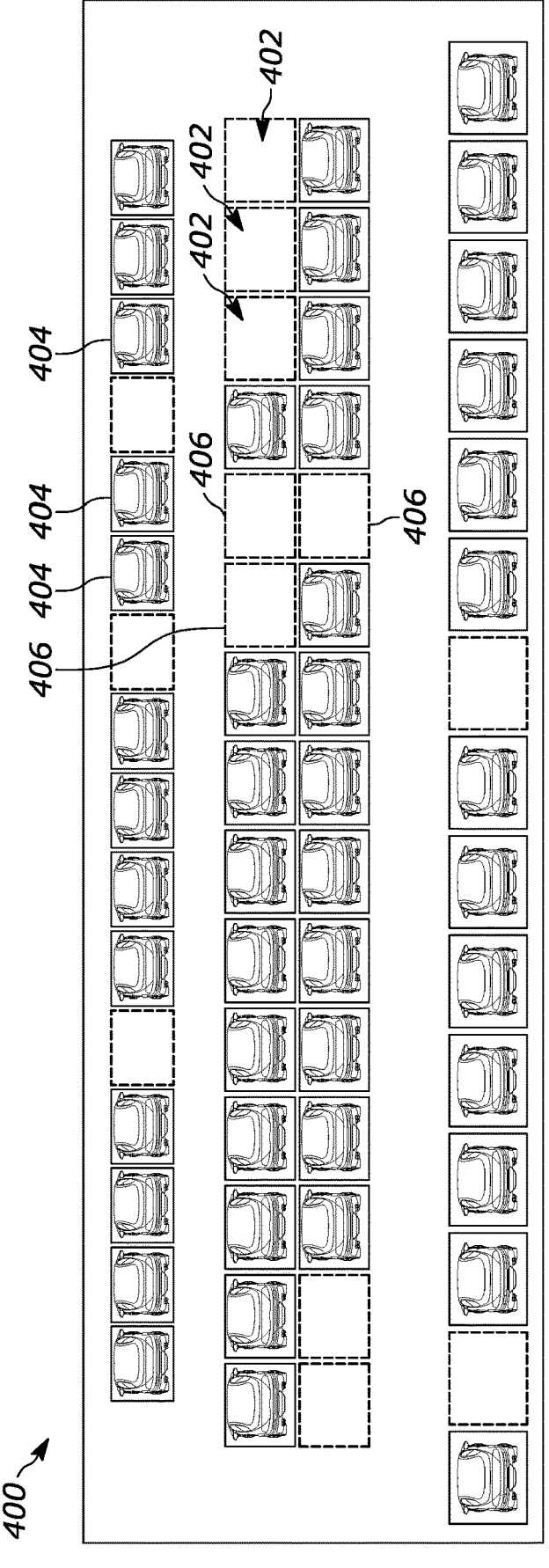
FIG. 4 illustrates an exemplary overhead view of a parking zone with colored overlays corresponding to whether a parking spot is occupied or unoccupied, according to an embodiment.

FIG. 4 illustrates an exemplary overhead view of a parking zone 400 according to one embodiment. This overhead view can be displayed on a display device such as those described above, such as a vehicle device, a smart phone, etc. The overhead view comprises a background image of the parking zone, and labels overlaid onto the background image. The background image can be a real-time view of the parking zone as captured from one or more cameras facing the parking zone, allowing one to view the real-time, live occupancy of a plurality of parking spaces 402. Alternatively, the background image can be a stitching of a plurality of images, such as from multiple cameras. In one embodiment, the background image is the digital map 120 created via one or more computing systems 102 as described above, e.g., via visual SLAM. The labels overlaid onto the background image can indicate various parking data (e.g., parking data 122), indicating, for example the occupancy of a parking spot or whether a parking spot is for handicapped. In the illustrated example, colored boxes 404 of a first color (e.g., red) are placed over parking spaces which are detected to be occupied by a vehicle. Colored boxes 406 of a second color (e.g., green) are placed over parking spaces which are detected to be unoccupied by a vehicle. Of course, colored boxes are merely one example of the labels that may be generated based on the parking data and output of the parking spot classification model 134. The illustrated view allows the driver to visually see the parking zone and view available parking spots. In other embodiments, the illustrated view is the digital map that was previously generated, and is currently updated with real-time data from the sensors of the vehicles parked (or recently traveled) in the parking zone.

Figure 5:
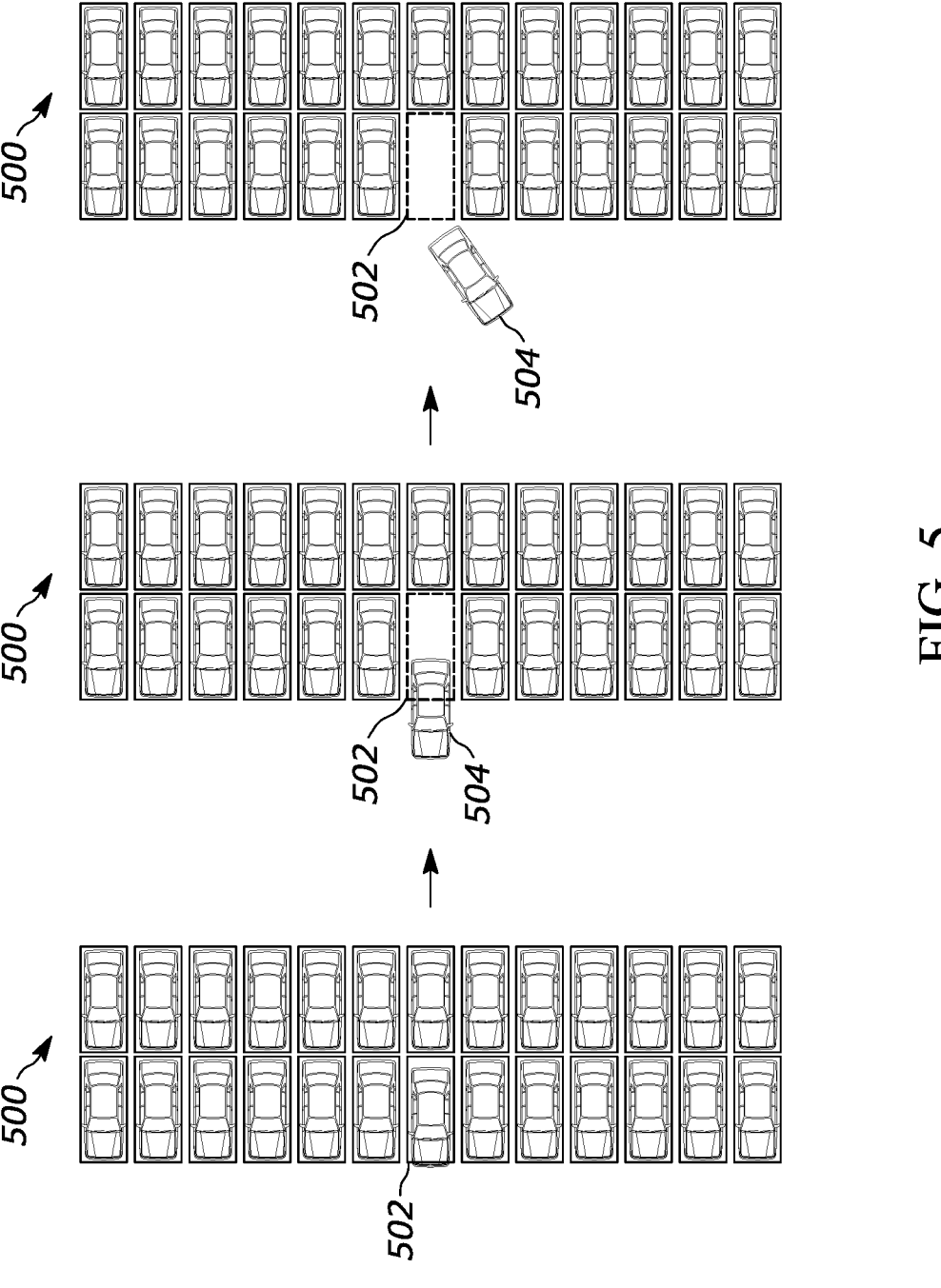
FIG. 5 illustrates an exemplary overhead view of a parking zone with colored overlays that change based on the occupancy of a parking spot, according to an embodiment.

FIG. 5 illustrates an updating process of the digital map and/or parking data associated therewith. Here, an overhead view of a portion of a parking zone 500 is provided. Again, the view may be a live view of the parking zone 500 captured from a camera, or can be the digital map 120 created via the various computing systems 102 disclosed herein. A plurality of colored overlays 502 (e.g., colored boxes) are once again placed over parking spots that are occupied by vehicles. Here, one or more of the computing systems determines, based on the associated image data, that a vehicle 504 is exiting an associated parking spot. The parking spot classification model is configured to alter the label of that parking space. For example, the colored overlay 502 associated with that parking spot can change colors, for example from red to green, as the vehicle 504 exits the parking space. Once another vehicle pulls into or parks in the parking space, the overlay 502 can again change back to red, indicating that the parking space is occupied. Each time a vehicle enters or leaves a parking space, the digital map 120 and/or parking data 122 can be updated such computing systems of other vehicles entering the parking zone 500 are provided with real-time data indicating the real-time availability of parking spaces.

FIG. 6 illustrates an example of a real-time virtual view 600 of an area beneath a vehicle 602, also referred to as a virtual bottom view herein. The virtual bottom view 600 can be created by leveraging sensor data from the sensors 126 of computing systems 102 of the vehicle 602, as well as other vehicles or RSUs nearby. For example, image data captured from the various image sensors can be stitched together to create a single view that appears as though it was taken from a single camera. FIG. 6 shows a perspective view of a parking space, but of course other views can be generated, such as a BEV or the like. Instead of typical BEV camera systems, here the vehicle 602 can be shown in transparent outline, with the surrounding environment (including the ground beneath the vehicle) completely visible. This is made possible due to the image data received from the sensors 126 of surrounding computing systems 102 of other vehicles or RSUs. While the vehicle 602 may not be able to directly detect the environment directly beneath the vehicle itself, the vehicle can rely on image data from other external computing systems 102 to create a virtual view of the environment beneath the vehicle 602. The image data from these other computing systems can include the most-recent image data of that area beneath the vehicle 602 prior to the vehicle 602 pulling into the parking space.

FIG. 7A illustrates a method 700 for assisting a vehicle to park based on real-time parking spot availability data. The method 700 can be performed or executed by one or more systems, components, or functions depicted in FIGS. 1, 2A, 2B, and 8, including, for example, one or more computing systems 102. In some alternative implementations, the functions noted in the flow chart blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flow chart illustration, and combinations of blocks in the block diagrams and/or flow chart illustration, can be implemented by special purpose hardware-based systems that perform the specified functions or acts or carry out combinations of special purpose hardware and computer instructions.

At 702, first image data (e.g., sensor data 118) sensed by a first sensor (e.g., sensors 126) mounted on a first vehicle (e.g., vehicle 110) is received. The first image data corresponds to a parking zone. The first image data can be received on a computing system onboard the first vehicle, or at a remote server. At 704, a digital map (e.g., digital map 120) of the parking zone is generated based on the first image data. This can be performed at a computing system onboard the first vehicle, or at a remote server. The digital map can be generated using the methods described above, such as visual SLAM. At 706, the digital map can be stored in storage (e.g., storage 116) on the remote server.

A second vehicle may then enter the parking zone. At 708, second image data sensed by a second sensor mounted on a second vehicle (e.g., vehicle 112) is received. The second image data corresponds to the same parking zone that was mapped by the first vehicle. At 710, the digital map previously-created is updated with information contained in the second image data. This can include, for example, updating parking data 122 associated with the parking zone.

The digital map and associated parking information about the parking zone is now up to date. This up to date information can be sent to a third vehicle that is about to park in the parking zone. For example, at 712, the updated digital map is sent to a device (e.g., vehicle display, mobile device, etc.) associated with a third vehicle. The updated digital map and associated labeling information (including, for example, which parking spots are available) is then displayed on the device at 714.

Figure 7B:
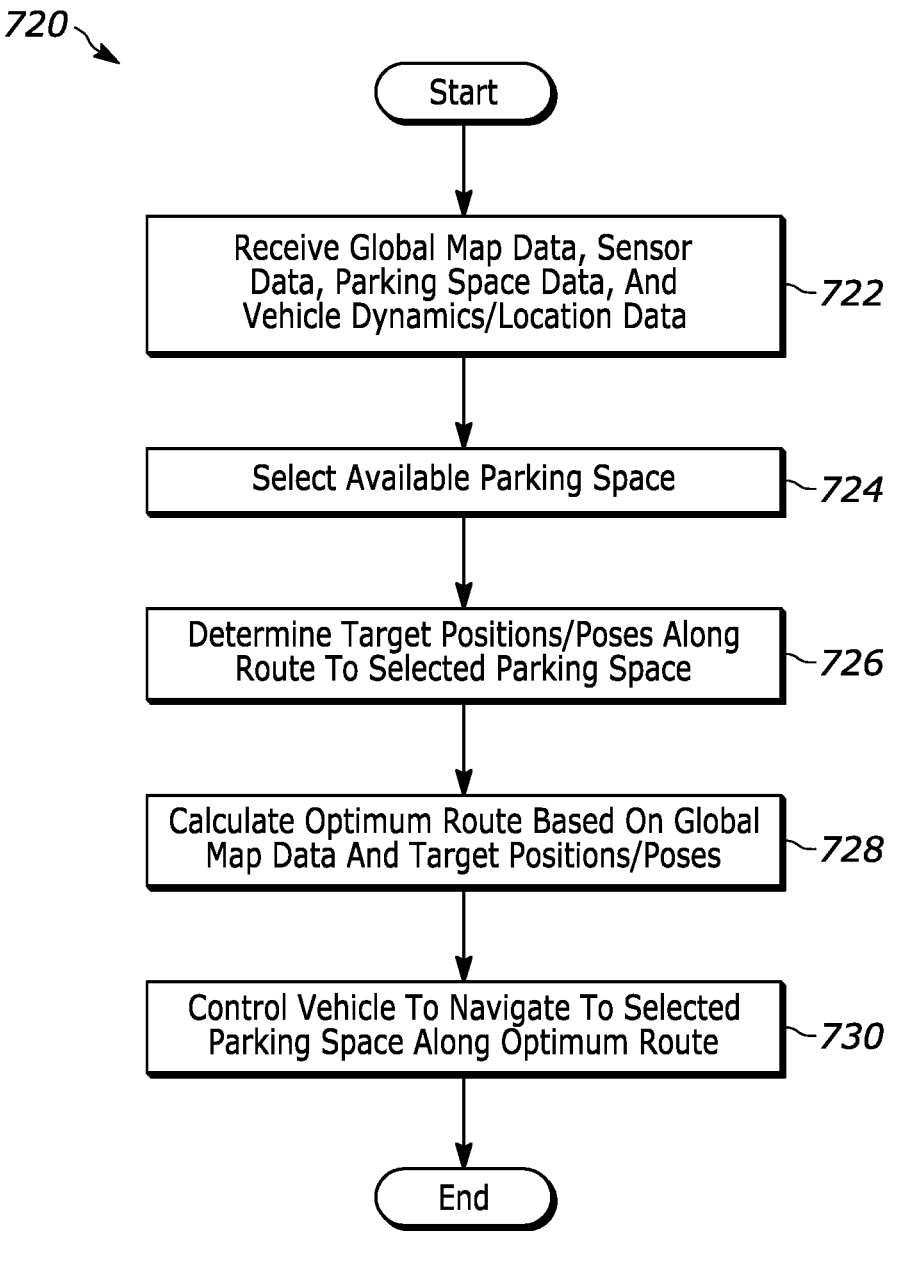
FIG. 7B illustrates a flow diagram of an example method for calculating an optimum route to a selected parking space using global map data, according to an embodiment.

FIG. 7B illustrates a method 720 for calculating an optimum route to a selected parking space using global map data according to the present disclosure. The method can be performed or executed by one or more systems, components, or functions depicted in FIGS. 1, 2A, 2B, and 8, including, for example, one or more computing systems 102. In some alternative implementations, the functions noted in the flow chart blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flow chart illustration, and combinations of blocks in the block diagrams and/or flow chart illustration, can be implemented by special purpose hardware-based systems that perform the specified functions or acts or carry out combinations of special purpose hardware and computer instructions. The method 720 can be performed in series with, in parallel with, or independently of the method 700. For example, the method 700 or another method may be used to obtain sensor data, vehicle dynamics/location data, global map data, parking space data, etc. as described above with respect to FIG. 2A and the method 720 may be used to calculate an optimum route between a current location of the vehicle and a selected parking space based on the sensor data, vehicle dynamics/location data, global map data, parking space data, etc.

At 722, data including digital map data (including global map data), parking space occupancy/availability data, sensor data, and vehicle dynamics/location data is received. In some examples, the data is received and combined using the fusion module 206. At 724, at least one available parking space is selected. At 726, a plurality of target positions/poses for the vehicle along a route between a current location of the vehicle and the selected parking space are determined. For example, the target positions/poses are determined based on at least the global map data.

At 728, an optimum route from the current location of the vehicle to the selected parking space is calculated based on at least the target positions/poses and the global map data. For example, DRL is performed to calculate the optimum route as described above. The optimum route does not include only the path traveled by the vehicle but also includes values for and/or limits to vehicle dynamics/pose, velocity, gear changes, braking, etc.

At 730, the vehicle (and/or the driver) is controlled to navigate to the selected parking space in accordance with the calculated optimum route. For example, the vehicle is controlled in accordance with trajectories, changes to acceleration, velocity, braking, selected gear, etc. corresponding to the calculated optimum route. Further, while traveling along the optimum route, the vehicle (e.g., the system 100) continuously determines whether to adjust the optimum route (e.g., based on sensor data, updated global map data, updated parking space availability/occupancy data, etc.). For example, the optimum route may be recalculated in response to a new parking space becoming available, the selected parking space becoming unavailable, new obstacles/objects being detected in the parking zone, etc.

Figure 8:
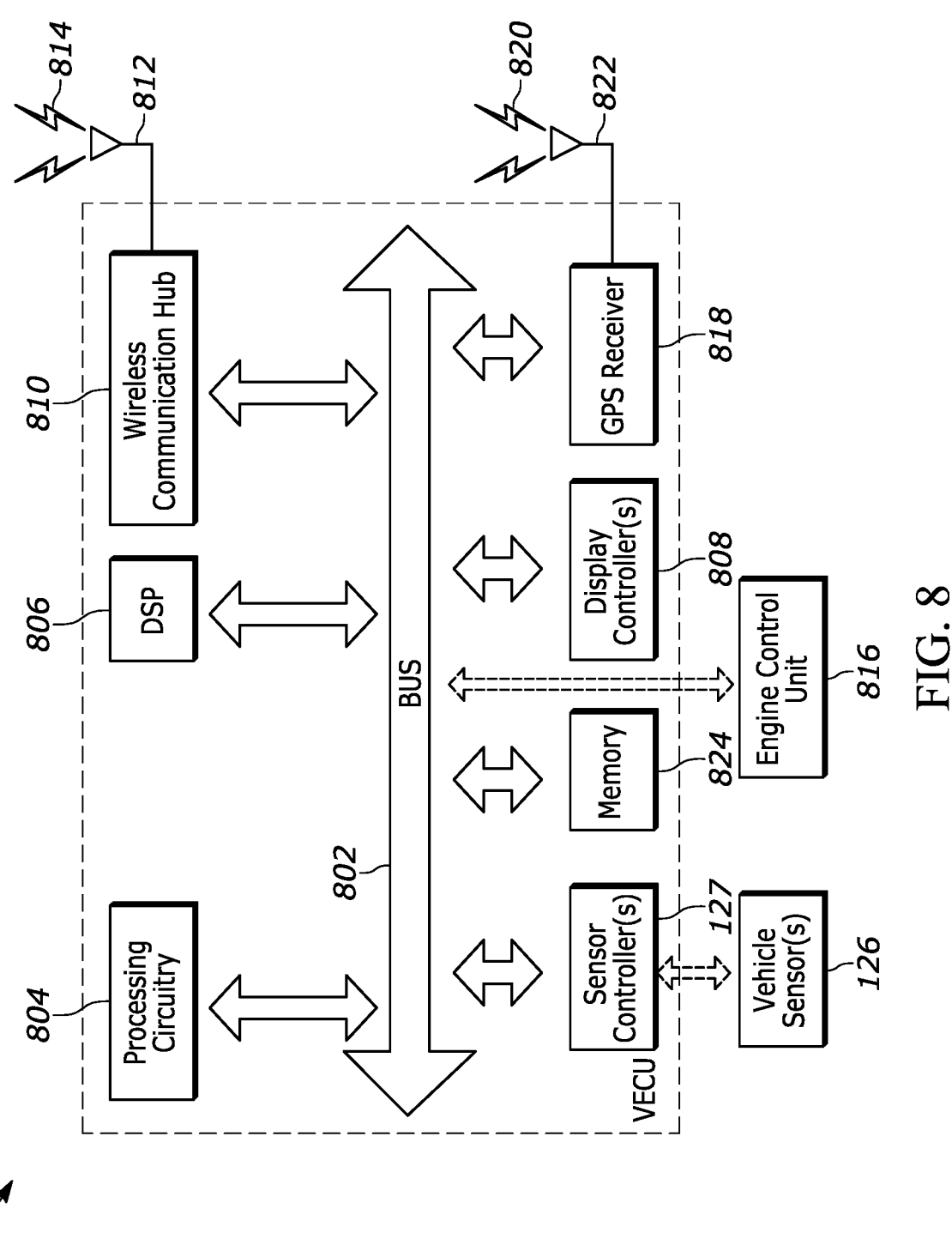
FIG. 8 illustrates a block diagram of a vehicle electronics control system, according to an exemplary embodiment of the present disclosure.

FIG. 8 is a block diagram of internal components of an exemplary embodiment of a computing system 800. The computing system 800 may include or be used to implement the computing systems and methods described above. In this embodiment, the computing system 800 may be embodied at least in part in a vehicle electronics control unit (VECU). It should be noted that FIG. 8 is meant only to provide a generalized illustration of various components, any or all of which may be utilized as appropriate. It can be noted that, in some instances, components illustrated by FIG. 9 can be localized to a single physical device and/or distributed among various networked devices, which may be disposed at different physical locations.

The computing system 800 has hardware elements that can be electrically coupled via a BUS 802. The hardware elements may include processing circuitry 804 which can include, without limitation, one or more processors, one or more special-purpose processors (such as digital signal processing (DSP) chips, graphics acceleration processors, application specific integrated circuits (ASICs), and/or the like), and/or other processing structure or means. The above-described processors can be specially-programmed to perform the operations disclosed herein, including, among others, image processing, data processing, and implementation of the machine learning models described above. Some embodiments may have a separate DSP 806, depending on desired functionality. The computing system 800 can also include one or more display controllers 808, which can control the display devices disclosed above, such as an in-vehicle touch screen, screen of a mobile device, and/or the like.

The computing system 800 may also include a wireless communication hub 810, or connectivity hub, which can include a modem, a network card, an infrared communication device, a wireless communication device, and/or a chipset (such as a Bluetooth device, an IEEE 802.11 device, an IEEE 802.16.4 device, a WiFi device, a WiMax device, cellular communication facilities including 4G, 5G, etc.), and/or the like. The wireless communication hub 810 can permit data to be exchanged with network 114, wireless access points, other computing systems, etc. The communication can be carried out via one or more wireless communication antenna 812 that send and/or receive wireless signals 814.

The computing system 800 can also include or be configured to communicate with an engine control unit 816, or other type of controller 108 described herein. In the case of a vehicle that does not include an internal combustion engine, the engine control unit may instead be a battery control unit or electric drive control unit configured to command propulsion of the vehicle. In response to instructions received via the wireless communications hub 810, the engine control unit 976 can be operated in order to control the movement of the vehicle during, for example, a parking procedure.

The computing system 800 also includes vehicle sensors 126 such as those described above with reference to FIG. 1. These sensors can include, without limitation, one or more accelerometer(s), gyroscope(s), camera(s), radar(s), LiDAR (s), odometric sensor(s), and ultrasonic sensor(s), as well as magnetometer(s), altimeter(s), microphone(s), proximity sensor(s), light sensor(s), and the like. These sensors can be controlled via associated sensor controller(s) 127.

The computing system 800 may also include a GPS receiver 818 capable of receiving signals 820 from one or more GPS satellites using a GPS antenna 822. The GPS receiver 818 can extract a position of the device, using conventional techniques, from satellites of an GPS system, such as a global navigation satellite system (GNSS) (e.g., Global Positioning System (GPS)), Galileo, GLONASS, Compass, Galileo, Beidou and/or other regional systems and/or the like.

The computing system 800 can also include or be in communication with a memory 824. The memory 824 can include, without limitation, local and/or network accessible storage, a disk drive, a drive array, an optical storage device, a solid-state storage device, such as a RAM which can be programmable, flash-updateable and/or the like. Such storage devices may be configured to implement any appropriate data stores, including without limitation, various file systems, database structures, and/or the like. The memory 824 can also include software elements (not shown), including an operating system, device drivers, executable libraries, and/or other code embedded in a computer-readable medium, such as one or more application programs, which may comprise computer programs provided by various embodiments, and/or may be designed to implement methods, and/or configure systems, provided by other embodiments, as described herein. In an aspect, then, such code and/or instructions can be used to configure and/or adapt a general purpose computer (or other device) to perform one or more operations in accordance with the described methods, thereby resulting in a special-purpose computer.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These memory devices may be non-transitory computer-readable storage mediums for storing computer-executable instructions which, when executed by one or more processors described herein, can cause the one or more processors to perform the techniques described herein. The processor and the memory can be supplemented by, or incorporated in, special purpose logic circuitry.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for calculating an optimum route for a first vehicle to travel from a current location to a selected parking space, the method comprising:
  receiving
    map data of a parking zone, wherein the map data includes local map data and global map data of the parking zone,
    sensor data,
    parking space data indicating availability of parking spaces within the parking zone, and
    vehicle dynamics and location data;

selecting, as the selected parking space, at least one available parking space based on the parking space data;
  determining a plurality of target positions between the current location and the selected parking space;
  calculating, in response to the selecting of the selected parking space and based on the plurality of target positions, the optimum route, wherein the calculating of the optimum route includes calculating trajectories of the first vehicle along an entire route between the current location and the selected parking space;
  controlling the first vehicle to travel from the current location to the selected parking space;
  receiving first image data sensed by a first sensor mounted on the first vehicle, wherein the first image data corresponds to the parking zone;
  receiving second image data sensed by a second sensor mounted on a second vehicle, wherein the second image data corresponds to the parking zone;
  generating a digital map of the parking zone based on the first image data and the second image data, wherein the global map data includes the first image data and the second image data;
  sending the digital map from a remote server to a device associated with the first vehicle; and
  displaying the digital map on the device, enabling a user of the device to see real-time information regarding availability of parking spaces in the parking zone.

2. The method of claim 1, wherein the global map data includes data obtained by at least one of (i) a second vehicle and (ii) a camera or sensor associated with the parking zone.

3. The method of claim 1, wherein the determining of the plurality of target positions includes calculating trajectory points for the first vehicle for each of the plurality of target positions.

4. The method of claim 1, wherein each of the plurality of target positions includes a target pose of the first vehicle.

5. The method of claim 4, wherein the calculating of the optimum route includes calculating, based on the target poses of the first vehicle at respective target positions of the plurality of target positions, a plurality of optimum route segments between the plurality of target positions.

6. The method of claim 1, wherein the calculating of the optimum route includes using deep reinforcement learning.

7. The method of claim 6, wherein the using of the deep reinforcement learning includes generating at least one path based on the global map data, generating a costmap, and calculating the optimum route based on the global map data and the costmap.

8. The method of claim 1, wherein the generating of the digital map includes using a visual simultaneous localization and mapping (SLAM) system.

9. A system for calculating an optimum route for a first vehicle to travel from a current location to a selected parking space, the system comprising:
  a plurality of image sensors configured to generate image data;
  one or more processors; and
  memory coupled to the one or more processors, the memory storing instructions that, when executed by the one or more processors, cause the one or more processors to:
  receive
    map data of a parking zone, wherein the map data includes local map data and global map data of the parking zone,
    sensor data,

23 parking space data indicating availability of parking spaces within the parking zone, and vehicle dynamics and location data;

select, as the selected parking space, at least one available parking space based on the parking space data;

determine a plurality of target positions between the current location and the selected parking space;

calculate, in response to the selecting of the selected parking space and based on the plurality of target positions, the optimum route, wherein the calculating of the optimum route includes calculating trajectories of the first vehicle along an entire route between the current location and the selected parking space;

control the first vehicle to travel from the current location to the selected parking space;

receive first image data sensed by a first sensor mounted on the first vehicle, wherein the first image data corresponds to the parking zone;

receive second image data sensed by a second sensor mounted on a second vehicle, wherein the second image data corresponds to the parking zone;

generate a digital map of the parking zone based on the first image data and the second image data, wherein the global map data includes the first image data and the second image data;

send the digital map from a remote server to a device associated with the first vehicle; and display the digital map on the device, enabling a user of the device to see real-time information regarding availability of parking spaces in the parking zone.

10. The system of claim 9, wherein the global map data includes data obtained by at least one of (i) a second vehicle and (ii) a camera or sensor associated with the parking zone.

11. The system of claim 9, wherein the determining of the plurality of target positions includes calculating trajectory points for the first vehicle for each of the plurality of target positions.

12. The system of claim 9, wherein each of the plurality of target positions includes a target pose of the first vehicle.

13. The system of claim 12, wherein the calculating of the optimum route includes calculating, based on the target poses of the first vehicle at respective target positions of the plurality of target positions, a plurality of optimum route segments between the plurality of target positions.

14. The system of claim 9, wherein the calculating of the optimum route includes using deep reinforcement learning.

15. The system of claim 14, wherein the using of the deep reinforcement learning includes generating at least one path based on the global map data, generating a costmap, and calculating the optimum route based on the global map data and the costmap.

16. A non-transitory computer-readable storage medium storing one or more programs, the one or more programs comprising instructions which, when executed by one or more processors of an electronic device, cause the electronic device to:

receive

24 map data of a parking zone, wherein the map data includes local map data and global map data of the parking zone, sensor data, parking space data indicating availability of parking spaces within the parking zone, and vehicle dynamics and location data;

select, as a selected parking space, at least one available parking space based on the parking space data;

determine a plurality of target positions between a current location and the selected parking space;

calculate, in response to the selecting of the selected parking space and based on the plurality of target positions, an optimum route from the current location of a first vehicle to the selected parking space, wherein the calculating of the optimum route includes calculating trajectories of the first vehicle along an entire route between the current location and the selected parking space;

control the first vehicle to travel from the current location to the selected parking space;

receive first image data sensed by a first sensor mounted on the first vehicle, wherein the first image data corresponds to the parking zone;

receive second image data sensed by a second sensor mounted on a second vehicle, wherein the second image data corresponds to the parking zone;

generate a digital map of the parking zone based on the first image data and the second image data, wherein the global map data includes the first image data and the second image data;

send the digital map from a remote server to a device associated with the first vehicle; and display the digital map on the device, enabling a user of the device to see real-time information regarding availability of parking spaces in the parking zone.

17. The non-transitory computer-readable storage medium of claim 16, wherein the global map data includes data obtained by at least one of (i) a second vehicle and (ii) a camera or sensor associated with the parking zone.

18. The non-transitory computer-readable storage medium of claim 16, wherein at least one of (i) the determining of the plurality of target positions includes calculating trajectory points for the first vehicle for each of the plurality of target positions and (ii) each of the plurality of target positions includes a target pose of the first vehicle.

19. The non-transitory computer-readable storage medium of claim 18, wherein the calculating of the optimum route includes calculating, based on the target poses of the first vehicle at respective target positions of the plurality of target positions, a plurality of optimum route segments between the plurality of target positions.

* * * * *